United States Patent
Goto et al.

(10) Patent No.: US 8,696,187 B2
(45) Date of Patent: Apr. 15, 2014

(54) SURFACE LIGHT SOURCE DEVICE, OPTICAL MEMBER, AND DISPLAY DEVICE

(75) Inventors: Masahiro Goto, Kashiwa (JP); Tetsuya Sadahiro, Mihara (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 181 days.

(21) Appl. No.: 13/256,338

(22) PCT Filed: Mar. 24, 2010

(86) PCT No.: PCT/JP2010/055090
§ 371 (c)(1),
(2), (4) Date: Sep. 13, 2011

(87) PCT Pub. No.: WO2010/110319
PCT Pub. Date: Sep. 30, 2010

(65) Prior Publication Data
US 2012/0020081 A1   Jan. 26, 2012

(30) Foreign Application Priority Data
Mar. 25, 2009   (JP) ................. 2009-074394

(51) Int. Cl.
    *F21V 7/04*   (2006.01)
(52) U.S. Cl.
    USPC ........................................ 362/616; 362/607

(58) Field of Classification Search
    USPC ................... 362/606–607, 616–619
    See application file for complete search history.

(56) References Cited

U.S. PATENT DOCUMENTS

| | | |
|---|---|---|
| 2009/0091919 A1 | 4/2009 | Goto |
| 2009/0201665 A1 | 8/2009 | Goto |
| 2009/0284954 A1* | 11/2009 | Yamada et al. ............. 362/97.2 |
| 2010/0214491 A1* | 8/2010 | Kuromizu et al. ........... 348/725 |

FOREIGN PATENT DOCUMENTS

| | | |
|---|---|---|
| JP | 2007-012517 A1 | 1/2007 |
| JP | 2008-305585 A1 | 12/2008 |
| JP | 2008-305589 A1 | 12/2008 |
| WO | 2007/094426 A1 | 8/2007 |

OTHER PUBLICATIONS

Japanese Office Action (Application No. 2010-068303) dated Nov. 15, 2013.

* cited by examiner

*Primary Examiner* — Julie Bannan
(74) *Attorney, Agent, or Firm* — Burr & Brown, PLLC

(57) ABSTRACT

An optical member includes a first optical sheet, and a second optical sheet disposed on the light exit side of the first optical sheet. The optical sheets each include a body portion, and unit shaped elements arranged side by side on the body portion. The ratio of the height of the unit shaped elements relative to the arrangement pitch of the unit shaped elements in the first optical sheet is smaller than that in the second optical sheet.

9 Claims, 9 Drawing Sheets

SURFACE LIGHT SOURCE DEVICE, OPTICAL MEMBER, AND DISPLAY DEVICE

BACKGROUND OF THE INVENTION

1. Field of the Invention

The present invention relates to a surface light source device, an optical member and a display device which can achieve a uniform in-plane distribution of luminance.

2. Description of Related Art

A direct-type surface light source device for use in a transmission type display device includes a light source and a plurality of optical sheets (optical films) for changing the travel direction of light from the light source. A light source, comprised of a plurality of light emitters arranged in parallel, is widely used in such a surface light source device. The plurality of optical sheets include a light diffusing sheet for diffusing light from the light source to shade (obscure) the image of the light source, and a light condensing sheet for condensing light in the front direction to enhance the front direction luminance.

An optical sheet, having linearly extending unit shaped elements (unit optical elements) arranged in a direction perpendicular to the longitudinal direction of the elements (so-called linear array), is widely used as a light condensing sheet (see e.g. WO 2007/094426A1). In particular, unit lenses, each having a shape corresponding to part of a circle or an ellipse in a section (main section) perpendicular to the longitudinal direction, are most commonly used as the unit shaped elements. Such an optical sheet can change the travel direction of light and adjust the angular distribution of luminance mainly in a plane along the arrangement direction of the unit shaped elements. Therefore, two such optical sheets are sometimes incorporated into a surface light source device such that the arrangement directions of their unit shaped elements are perpendicular to each other, as disclosed in WO 2007/094426A1. This enables adjustment of the angular distribution of luminance in two different directions.

In a surface light source device which uses a light source comprised of a plurality of light emitters, the luminance tends to be lower in an intermediate region between two adjacent light emitters. The above-described light condensing sheet, used in a surface light source device, also has a light diffusing function to reduce such in-plane variation of luminance. Practically, however, it has not been possible only with the use of the light diffusing function of a light condensing sheet to equalize the in-plane distribution of luminance and sufficiently obscure the image of light emitters. Therefore, a surface light source device generally has a light diffusing sheet disposed between a light condensing sheet and a light source. When the light diffusing sheet has a strong light diffusing effect, the light diffusing sheet can cause a problem, such as lowering of the efficiency in the use of source light. It is therefore highly desirable if an optical sheet, having a light condensing function, can effectively perform a light diffusing function, whereby it becomes possible to use a light diffusing sheet having a reduced light diffusing effect, or to even eliminate the use of a light diffusing sheet.

SUMMARY OF THE INVENTION

The present invention has been made in view of the above situation. It is therefore an object of the present invention to provide an optical member, a surface light source device and a display device which can reduce in-plane variation of luminance, thereby obscuring the image of a light source.

A first optical member according to the present invention comprises:
a first optical sheet; and
a second optical sheet disposed on a light exit side of the first optical sheet,
wherein:
the first optical sheet includes a body portion, and unit shaped elements arranged on the light exit side of the body portion and each extending linearly in a direction intersecting an arrangement direction;
the second optical sheet includes a body portion, and unit shaped elements arranged on the light exit side of the body portion and each extending linearly in a direction intersecting an arrangement direction;
the first optical sheet and the second optical sheet are disposed such that the arrangement direction of the unit shaped elements of the first optical sheet intersects the arrangement direction of the unit shaped elements of the second optical sheet; and
a ratio of a height H1 of the unit shaped elements of the first optical sheet from the body portion of the first optical sheet relative to an arrangement pitch P1 of the unit shaped elements of the first optical sheet is smaller than a ratio of a height H2 of the unit shaped elements of the second optical sheet from the body portion of the second optical sheet relative to an arrangement pitch P2 of the unit shaped elements of the second optical sheet.

In a preferred embodiment of the present invention, the first optical member is disposed in a position facing a light source including light emitters, and
a proportion of a contour region in an entire length of a contour of each unit shaped element of the first optical sheet in a main section which is parallel both to a normal direction of the first optical sheet and to the arrangement direction of the unit shaped elements of the first optical sheet, in which region the angle θa1 between a tangent to the contour of the unit shaped element of the first optical sheet and a sheet surface of the first optical sheet satisfies following formulae (1) and (2), may be larger than a proportion of a contour region in an entire length of a contour of each unit shaped element of the second optical sheet in a main section which is parallel both to a normal direction of the second optical sheet and to the arrangement direction of the unit shaped elements of the second optical sheet, in which region an angle θa2 between a tangent to the contour of the unit shaped element of the second optical sheet and a sheet surface of the second optical sheet satisfies following formulae (3) and (4):

$$\text{Arccos}(\cos(\theta i b1) \times \cos(\theta a1)) \leq \text{Arcsin}(1/(n1)) \tag{1}$$

$$(\theta i b1) = \text{Arcsin}((1/(n1)) \times (\sin(\text{Arctan}((d1b)/2/(h1))))) \tag{2}$$

$$\text{Arccos}(\cos(\theta i b2) \times \cos(\theta a2)) \leq \text{Arcsin}(1/(n2)) \tag{3}$$

$$(\theta i b2) = \text{Arcsin}((1/(n2)) \times (\sin(\text{Arctan}((d2b)/2/(h2))))) \tag{4}$$

wherein h1 represents a distance from the first optical sheet to the light emitters of the light source in the main section of the first optical sheet and in the normal direction of the first optical sheet, d1b represents a distance between two adjacent light emitters in a longitudinal direction of the unit shaped elements of the first optical sheet, and n1 represents a refractive index of the first optical sheet, and
wherein h2 represents a distance from the second optical sheet to the light emitters of the light source in the main section of the second optical sheet and in the normal direction of the second optical sheet, d2b represents a distance between two adjacent light emitters in a longitudinal direction of the unit shaped elements of the second optical sheet, and n2 represents a refractive index of the second optical sheet.

In the first optical member of the present invention, the proportion of the contour region, in which the angle θa1 between the tangent to the contour of the unit shaped element of the first optical sheet and the sheet surface of the first optical sheet satisfies the formulae (1) and (2), in the entire length of the contour of the unit shaped element of the first optical sheet in the main section of the first optical sheet, may not be less than 30%.

A second optical member according to the present invention, disposed opposite a light source including light emitters, comprising:

a first optical sheet; and a second optical sheet disposed on a light exit side of the first optical sheet, wherein:

the first optical sheet includes a body portion, and unit shaped elements arranged on the light exit side of the body portion and each extending linearly in a direction intersecting an arrangement direction;

the second optical sheet includes a body portion, and unit shaped elements arranged on the light exit side of the body portion and each extending linearly in a direction intersecting an arrangement direction;

the first optical sheet and the second optical sheet are disposed such that the arrangement direction of the unit shaped elements of the first optical sheet intersects the arrangement direction of the unit shaped elements of the second optical sheet; and a proportion of a contour region in an entire length of a contour of each unit shaped element of the first optical sheet in a main section which is parallel both to a normal direction of the first optical sheet and to the arrangement direction of the unit shaped elements of the first optical sheet, in which region an angle θa1 between a tangent to the contour of the unit shaped element of the first optical sheet and a sheet surface of the first optical sheet satisfies following formulae (5) and (6), is larger than a proportion of a contour region in an entire length of a contour of each unit shaped element of the second optical sheet in a main section which is parallel both to a normal direction of the second optical sheet and to the arrangement direction of the unit shaped elements of the second optical sheet, in which region an angle θa2 between a tangent to the contour of the unit shaped element of the second optical sheet and a sheet surface of the second optical sheet satisfies following formulae (7) and (8):

$$\text{Arccos}(\cos(\theta ib1) \times \cos(\theta a1)) \leq \text{Arcsin}(1/(n1)) \tag{5}$$

$$(\theta ib1) = \text{Arcsin}((1/(n1)) \times (\sin(\text{Arctan}((d1b)/2/(h1))))) \tag{6}$$

$$\text{Arccos}(\cos(\theta ib2) \times \cos(\theta a2)) \leq \text{Arcsin}(1/(n2)) \tag{7}$$

$$(\theta ib2) = \text{Arcsin}((1/(n2)) \times (\sin(\text{Arctan}((d2b)/2/(h2))))) \tag{8}$$

wherein h1 represents a distance from the first optical sheet to the light emitters of the light source in the main section of the first optical sheet and in the normal direction of the first optical sheet, d1b represents a distance between two adjacent light emitters in a longitudinal direction of the unit shaped elements of the first optical sheet, and n1 represents a refractive index of the first optical sheet, and wherein h2 represents a distance from the second optical sheet to the light emitters of the light source in the main section of the second optical sheet and in the normal direction of the second optical sheet, d2b represents a distance between two adjacent light emitters in a longitudinal direction of the unit shaped elements of the second optical sheet, and n2 represents a refractive index of the second optical sheet.

In the second optical member of the present invention, the proportion of the contour region, in which the angle θa1 between the tangent to the contour of the unit shaped element of the first optical sheet and the sheet surface of the first optical sheet satisfies the formulae (5) and (6), in the entire length of the contour of the unit shaped element of the first optical sheet in the main section of the first optical sheet, may not be less than 30%.

A third optical member according to the present invention, disposed opposite a light source including light emitters, comprising:

a first optical sheet; and a second optical sheet disposed on a light exit side of the first optical sheet, wherein:

the first optical sheet includes a body portion, and unit shaped elements arranged on the light exit side of the body portion and each extending linearly in a direction intersecting an arrangement direction;

the second optical sheet includes a body portion, and unit shaped elements arranged on the light exit side of the body portion and each extending linearly in a direction intersecting an arrangement direction;

the first optical sheet and the second optical sheet are disposed such that the arrangement direction of the unit shaped elements of the first optical sheet intersects the arrangement direction of the unit shaped elements of the second optical sheet; and a proportion of a contour region in an entire length of a contour of each unit shaped element of the first optical sheet in a main section which is parallel both to a normal direction of the first optical sheet and to the arrangement direction of the unit shaped elements of the first optical sheet, in which region an angle θa1 between a tangent to the contour of the unit shaped element of the first optical sheet and a sheet surface of the first optical sheet satisfies following formulae (9) and (10), is not less than 30%:

$$\text{Arccos}(\cos(\theta ib1) \times \cos(\theta a1)) \leq \text{Arcsin}(1/(n1)) \tag{9}$$

$$(\theta ib1) = \text{Arcsin}((1/(n1)) \times (\sin(\text{Arctan}((d1b)/2/(h1))))) \tag{10}$$

wherein h1 represents a distance from the first optical sheet to the light emitters of the light source in the main section of the first optical sheet and in the normal direction of the first optical sheet, d1b represents a distance between two adjacent light emitters in a longitudinal direction of the unit shaped elements of the first optical sheet, and n1 represents a refractive index of the first optical sheet.

In any one of the first to third optical members of the present invention, a proportion of a contour region in an entire length of a contour of each unit shaped element of the first optical sheet in a main section which is parallel both to a normal direction of the first optical sheet and to the arrangement direction of the unit shaped elements of the first optical sheet, in which region an angle θa1 between a tangent to the contour of the unit shaped element of the first optical sheet and a sheet surface of the first optical sheet satisfies following formulae (II) and (12), may not be less than 10%, and;

a proportion of a contour region in an entire length of a contour of each unit shaped element of the second optical sheet in a main section which is parallel both to a normal direction of the second optical sheet and to the arrangement direction of the unit shaped elements of the second optical sheet, in which region an angle θa2 between a tangent to the contour of the unit shaped element of the second optical sheet and a sheet surface of the second optical sheet satisfies following formulae (13) and (14), may not be less than 10%:

$$-10°≤\text{Arcsin}((n1)×\sin((θa1)-(θia1)))-(θa1)≤10° \quad (11)$$

$$(θia1)=\text{Arcsin}((1/(n1))×(\sin(\text{Arctan}((d1a)/2/(h1))))) \quad (12)$$

$$-10°≤\text{Arcsin}((n2)×\sin((θa2)-(θia2)))-(θa2)≤10° \quad (13)$$

$$(θia2)=\text{Arcsin}((1/(n2))×(\sin(\text{Arctan}((d2a)/2/(h2))))) \quad (14)$$

wherein h1 represents a distance from the first optical sheet to the light emitters of the light source in the main section of the first optical sheet and in the normal direction of the first optical sheet, d1a represents a distance between two adjacent light emitters in the arrangement direction of the unit shaped elements of the first optical sheet, and n1 represents a refractive index of the first optical sheet, and wherein h2 represents a distance from the second optical sheet to the light emitters of the light source in the main section of the second optical sheet and in the normal direction of the second optical sheet, d2a represents a distance between two adjacent light emitters in the arrangement direction of the unit shaped elements of the second optical sheet, and n2 represents a refractive index of the second optical sheet.

A fourth optical member according to the present invention,
disposed opposite a light source including light emitters, comprising:
  a first optical sheet; and
  a second optical sheet disposed on a light exit side of the first optical sheet,
  wherein:
  the first optical sheet includes a body portion, and unit shaped elements arranged on the light exit side of the body portion and each extending linearly in a direction intersecting an arrangement direction;
  the second optical sheet includes a body portion, and unit shaped elements arranged on the light exit side of the body portion and each extending linearly in a direction intersecting an arrangement direction;
  the first optical sheet and the second optical sheet are disposed such that the arrangement direction of the unit shaped elements of the first optical sheet intersects the arrangement direction of the unit shaped elements of the second optical sheet;
  a proportion of a contour region in an entire length of a contour of each unit shaped element of the first optical sheet in a main section which is parallel both to a normal direction of the first optical sheet and to the arrangement direction of the unit shaped elements of the first optical sheet, in which region an angle θa1 between a tangent to the contour of the unit shaped element of the first optical sheet and a sheet surface of the first optical sheet satisfies following formulae (11) and (12), may not be less than 10%, and;
  a proportion of a contour region in an entire length of a contour of each unit shaped element of the second optical sheet in a main section which is parallel both to a normal direction of the second optical sheet and to the arrangement direction of the unit shaped elements of the second optical sheet, in which region an angle θa2 between a tangent to the contour of the unit shaped element of the second optical sheet and a sheet surface of the second optical sheet satisfies following formulae (13) and (14), may not be less than 10%:

$$-10°≤\text{Arcsin}((n1)×\sin((θa1)-(θia1)))-(θa1)≤10° \quad (11)$$

$$(θia1)=\text{Arcsin}((1/(n1))×(\sin(\text{Arctan}((d1a)/2/(h1))))) \quad (12)$$

$$-10°≤\text{Arcsin}((n2)×\sin((θa2)-(θia2)))-(θa2)≤10° \quad (13)$$

$$(θia2)=\text{Arcsin}((1/(n2))×(\sin(\text{Arctan}((d2a)/2/(h2))))) \quad (14)$$

wherein h1 represents a distance from the first optical sheet to the light emitters of the light source in the main section of the first optical sheet and in the normal direction of the first optical sheet, d1a represents a distance between two adjacent light emitters in the arrangement direction of the unit shaped elements of the first optical sheet, and n1 represents a refractive index of the first optical sheet, and wherein h2 represents a distance from the second optical sheet to the light emitters of the light source in the main section of the second optical sheet and in the normal direction of the second optical sheet, d2a represents a distance between two adjacent light emitters in the arrangement direction of the unit shaped elements of the second optical sheet, and n2 represents a refractive index of the second optical sheet.

In any one of the first to fourth optical members of the present invention, the unit shaped elements of the second optical sheet may include a base material, and a light diffusing material dispersed in the base material; and a degree of light diffusion in the unit shaped elements of the second optical sheet may be higher than a degree of light diffusion in the body portion of the second optical sheet, higher than a degree of light diffusion in the unit shaped elements of the first optical sheet, and higher than a degree of light diffusion in the body portion of the first optical sheet. In such an optical member according to the present invention, a ratio of the refractive index of the light diffusing material of the unit shaped elements of the second optical sheet relative to a refractive index of the base material of the unit shaped elements of the second optical sheet may not be more than 0.9 or may not be less than 1.1.

Any one of the first to fourth optical members of the present invention my further comprise a third optical sheet disposed on the light exit side of the second optical sheet.

Any one of the first to fourth optical members of the present invention may further comprise a polarization separation film disposed on the light exit side of the second optical sheet.

In any one of the first to fourth optical members of the present invention, the light emitters of the light source may be arranged in two different directions on a surface parallel to a sheet surface of the first optical sheet.

In any one of the first to fourth optical members of the present invention, in a main section of the first optical sheet, which is parallel both to a normal direction of the first optical sheet and to the arrangement direction of the unit shaped elements of the first optical sheet, a contour of each unit shaped element of the first optical sheet may be a shape that can be approximated by a circular arc, an elliptical arc, a straight line, or a combination thereof; and in a main section of the second optical sheet, which is parallel both to a normal direction of the second optical sheet and to the arrangement direction of the unit shaped elements of the second optical sheet, a contour of each unit shaped element of the second optical sheet may be a shape that can be approximated by a circular arc, an elliptical arc, a straight line, or a combination thereof.

In any one of the first to fourth optical members of the present invention, in the main section of the first optical sheet, which is parallel both to the normal direction of the first optical sheet and to the arrangement direction of the unit shaped elements of the first optical sheet, the angle of a tangent to the contour of each unit shaped element of the first optical sheet with respect to the sheet surface of the body portion of the first optical sheet may increase as the tangent point between the tangent and the unit shaped element moves from the top of the contour of the unit shaped element, the farthest point from the body portion in the normal direction of the first optical sheet, toward either end of the contour of the unit shaped element.

In any one of the first to fourth optical members of the present invention, in the main section of the second optical sheet, which is parallel both to the normal direction of the second optical sheet and to the arrangement direction of the unit shaped elements of the second optical sheet, the angle of a tangent to the contour of each unit shaped element of the second optical sheet with respect to the sheet surface of the body portion of the second optical sheet may increase as the tangent point between the tangent and the unit shaped element moves from the top of the contour of the unit shaped element, the farthest point from the body portion in the normal direction of the second optical sheet, toward either end of the contour of the unit shaped element.

A first surface light source device according to the present invention comprises:

a light source including light emitters; and any one of the first to fourth optical members of the present invention, disposed in a position facing the light source.

In the first surface light source device of the present invention, a distance between two adjacent light emitters in the longitudinal direction of the unit shaped elements of the first optical sheet may be shorter than a distance between two adjacent light emitters in the longitudinal direction of the unit shaped elements of the second optical sheet.

A second surface light source device according to the present invention comprises:

a light source including light emitters;

a first optical sheet disposed in a position facing the light source; and a second optical sheet disposed on a light exit side of the first optical sheet, wherein:

the first optical sheet includes a body portion, and unit shaped elements arranged on the light exit side of the body portion and each extending linearly in a direction intersecting an arrangement direction;

the second optical sheet includes a body portion, and unit shaped elements arranged on the light exit side of the body portion and each extending linearly in a direction intersecting an arrangement direction;

the first optical sheet and the second optical sheet are disposed such that the arrangement direction of the unit shaped elements of the first optical sheet intersects the arrangement direction of the unit shaped elements of the second optical sheet; and a distance between two adjacent light emitters in a longitudinal direction of the unit shaped elements of the first optical sheet is shorter than a distance between two adjacent light emitters in a longitudinal direction of the unit shaped elements of the second optical sheet.

A display device according to the present invention comprises:

any one of the first and second surface light source devices of the present invention; and a transmission type display unit disposed in a position facing the surface light source device.

DETAILED DESCRIPTION OF THE INVENTION

Figure 1:
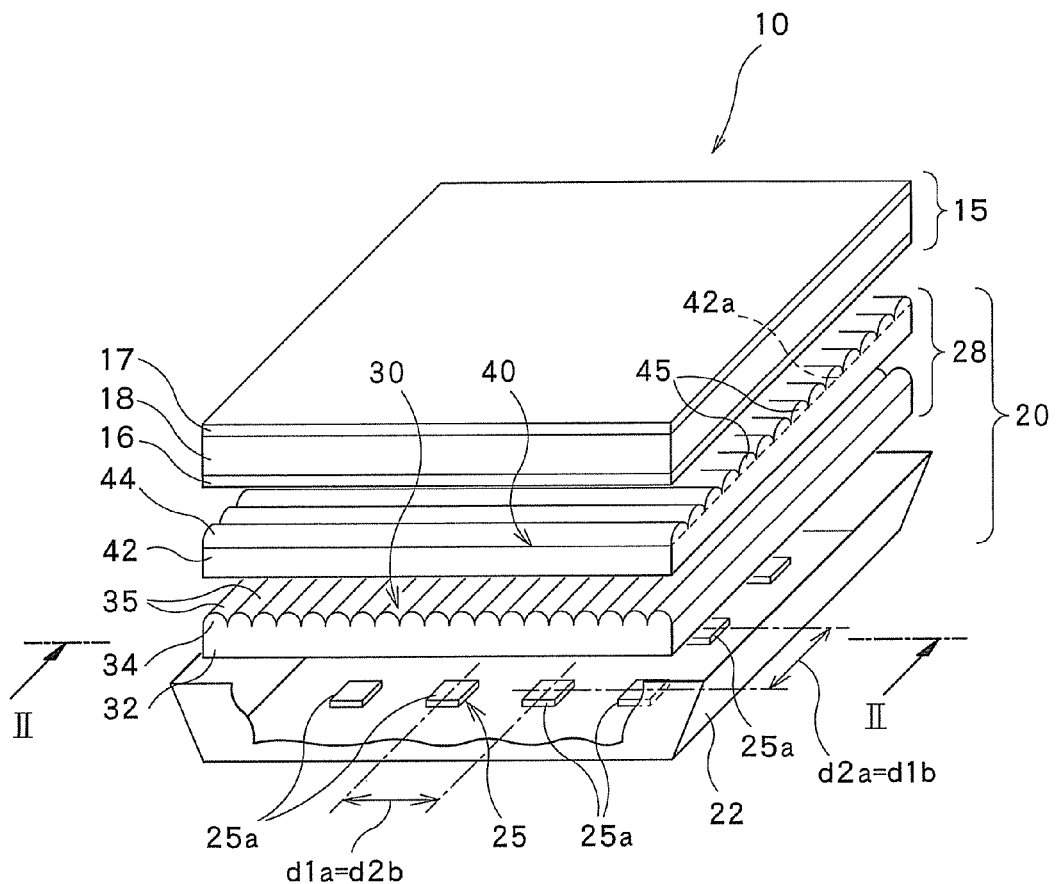
FIG. 1 is a perspective view for illustrating the schematic construction of a transmission type display device and a surface light source device according to one embodiment of the present invention.

Preferred embodiments of the present invention will now be described with reference to the drawings. In the drawings attached to the present specification, for the sake of illustration and easier understanding, scales, horizontal to vertical dimensional ratios, etc. are exaggeratingly modified from those of the real things.

Figure 2:
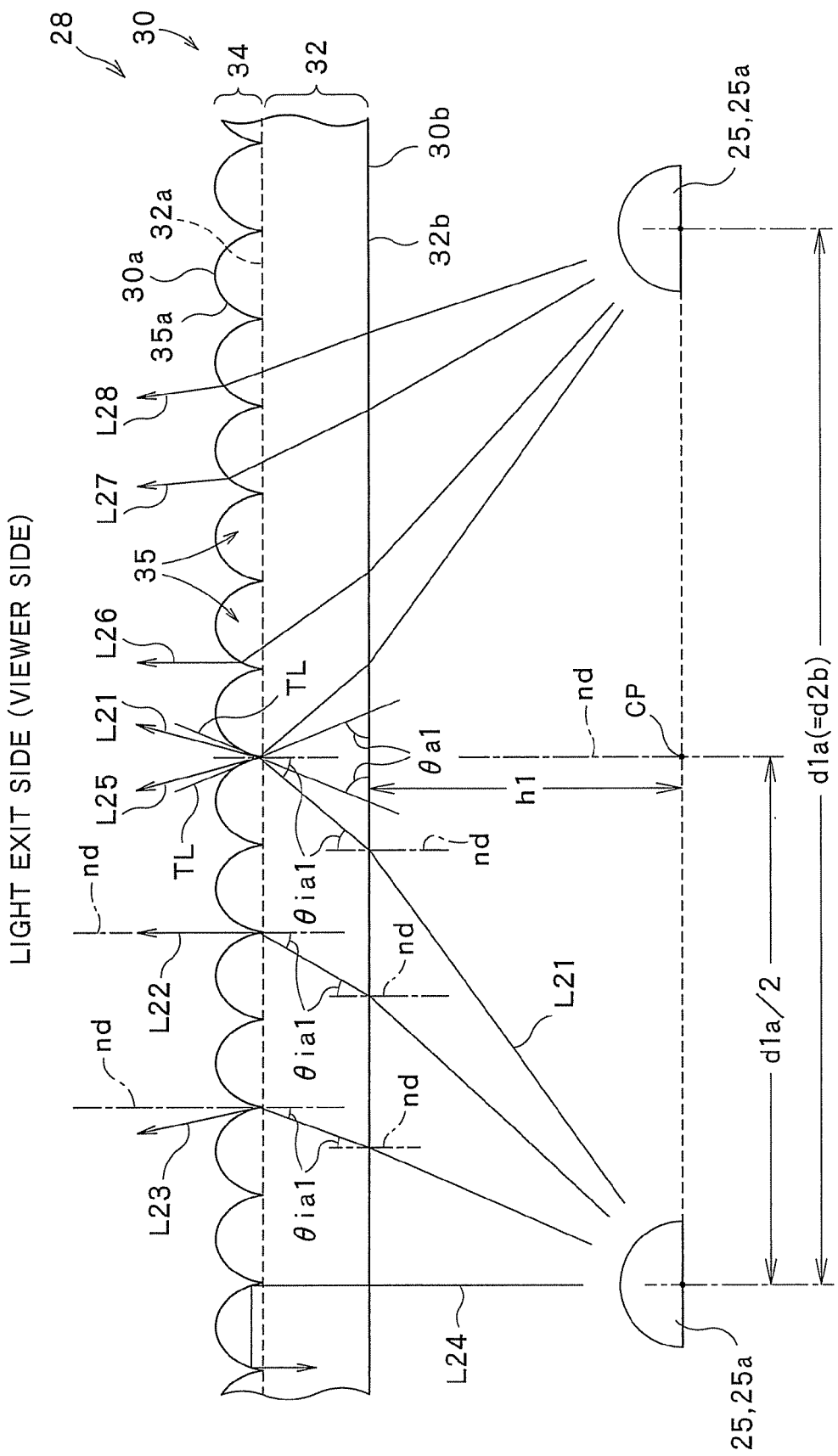
FIG. 2 is a sectional view taken along the line II-II of FIG. 1, illustrating a first optical sheet incorporated into the surface light source device of FIG. 1.
Figure 3:
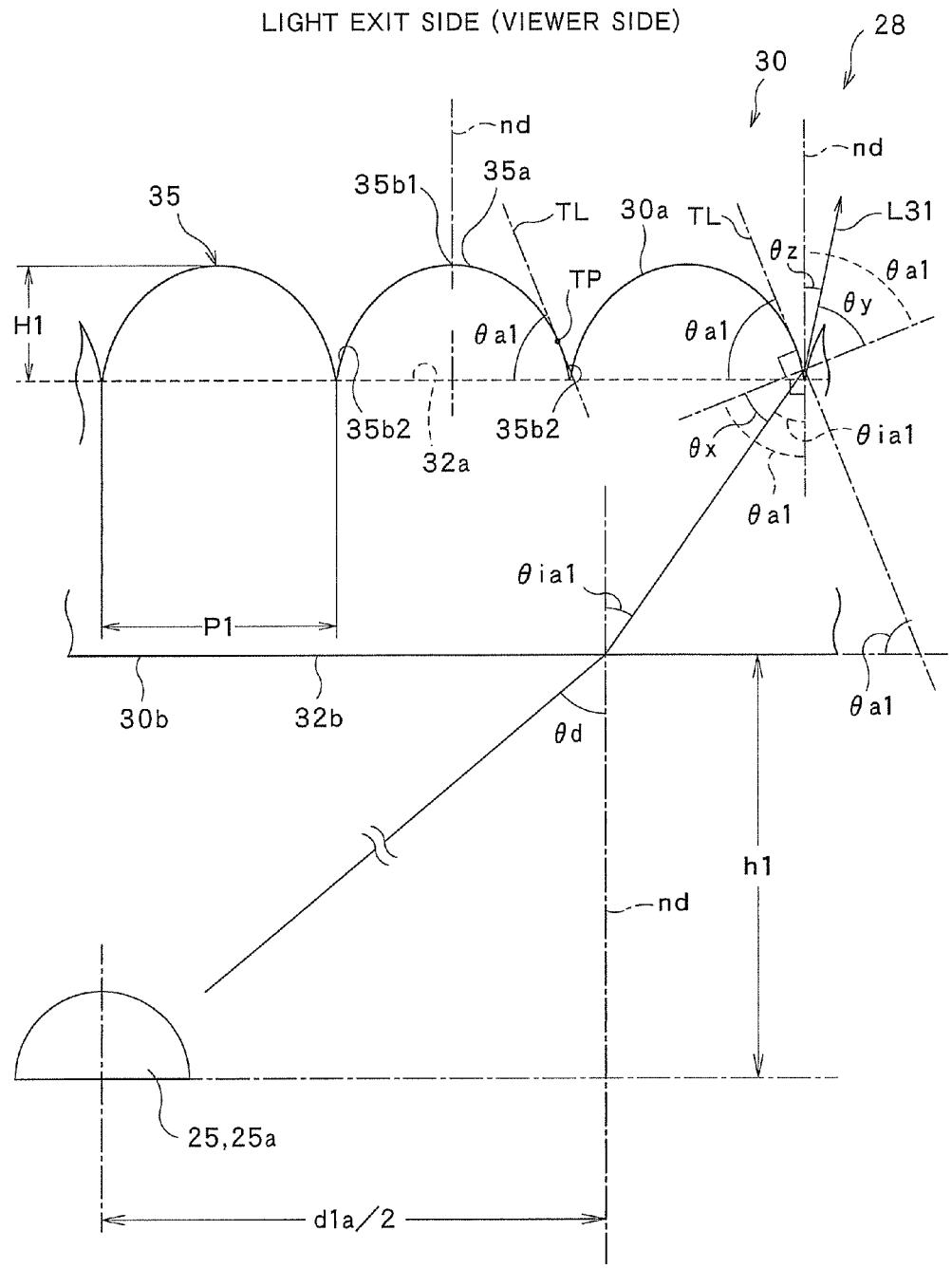
FIG. 3 is an enlarged view of the optical sheet of FIG. 2 in the same section as FIG. 2.
Figure 4:
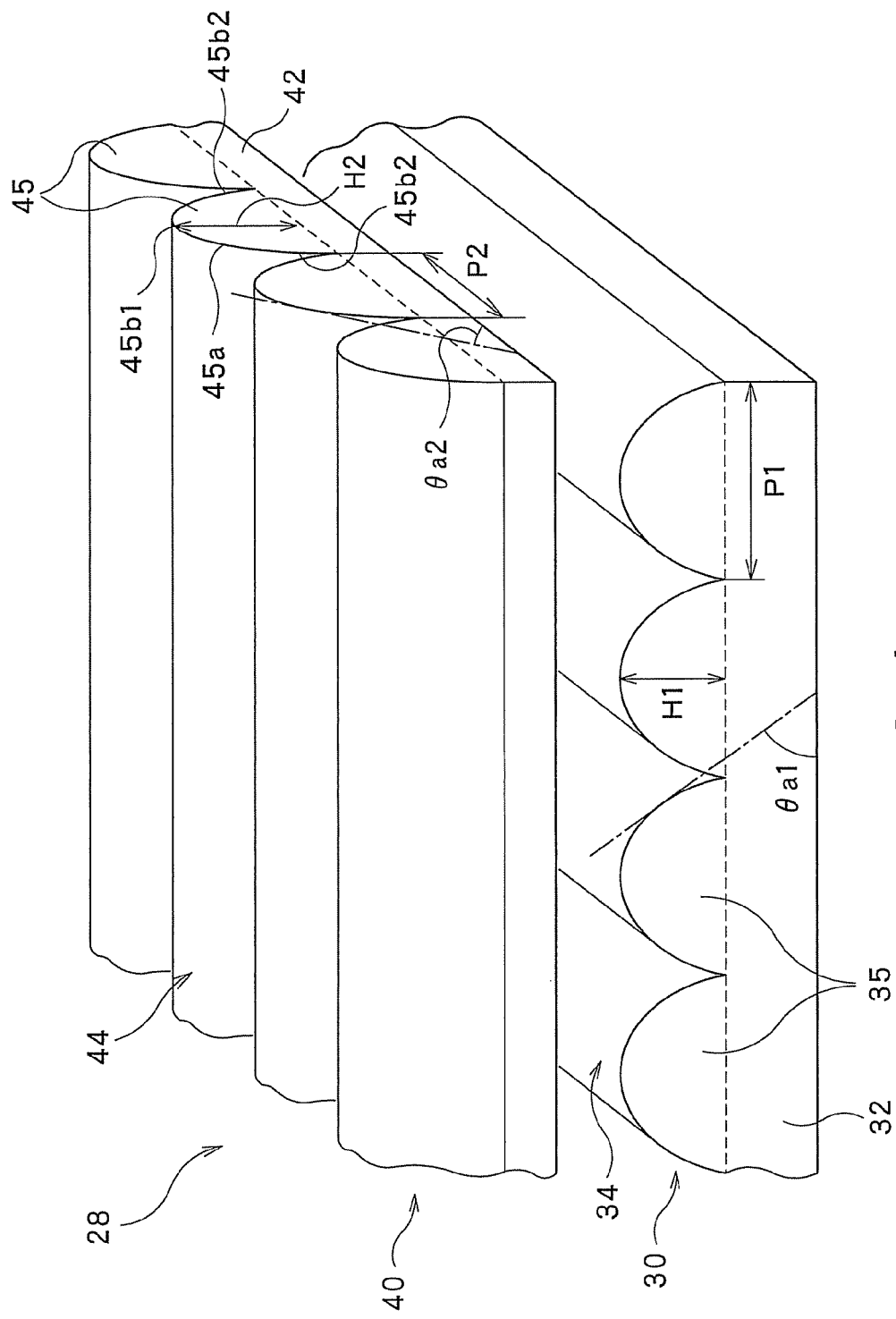
FIG. 4 is a perspective view of an optical member incorporated into the surface light source device of FIG. 1.
Figure 5:
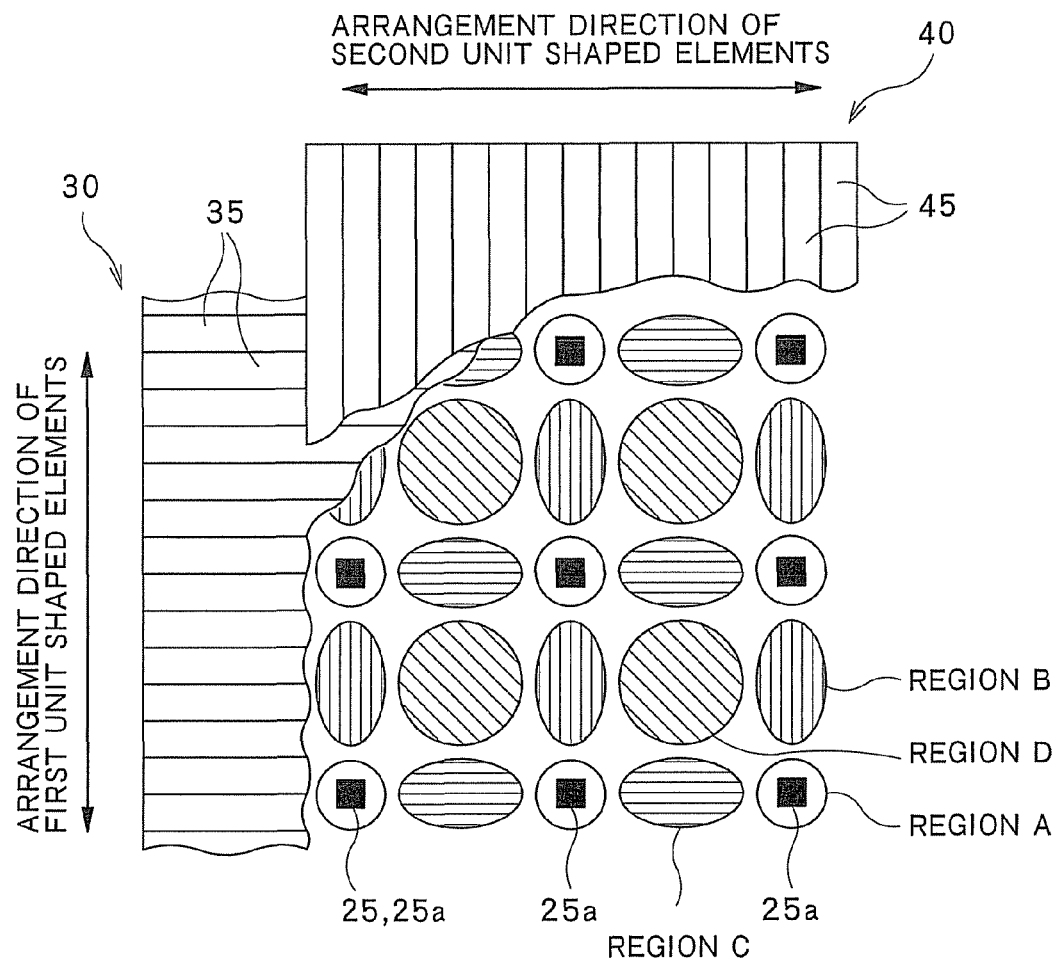
FIG. 5 is a diagram for illustration of the action of the surface light source device, schematically showing the construction of the surface light source device.
Figure 6A:
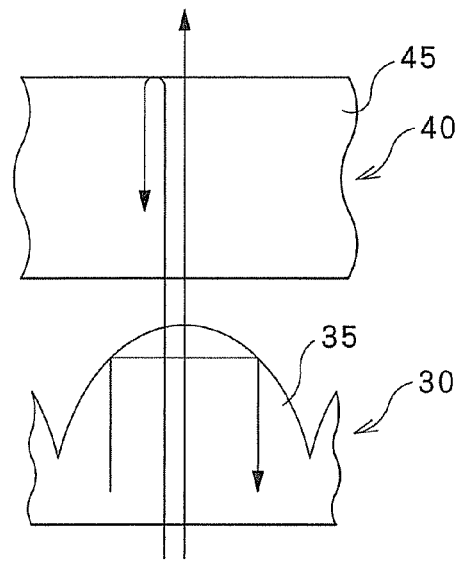
FIG. 6A is a diagram for illustration of the optical action of the optical member in a region A, schematically showing the optical member in a section parallel to the main section of the first optical sheet.
Figure 6B:
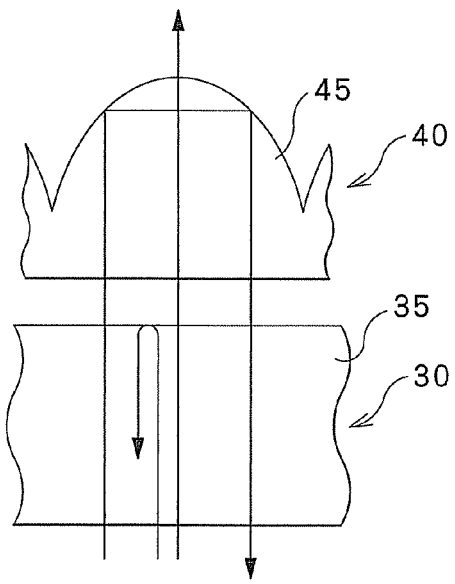
FIG. 6B is a diagram for illustration of the optical action of the optical member in a region A, schematically showing the optical member in a section parallel to the main section of the second optical sheet.
Figure 7A:
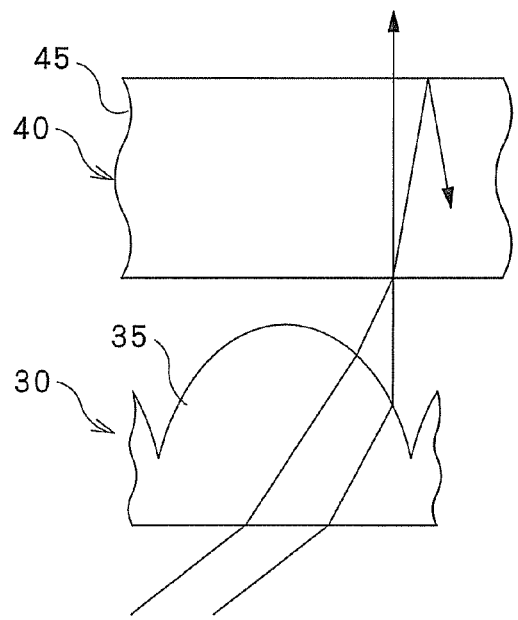
FIG. 7A is a diagram for illustration of the optical action of the optical member in a region B, schematically showing the optical member in a section parallel to the main section of the first optical sheet.
Figure 7B:
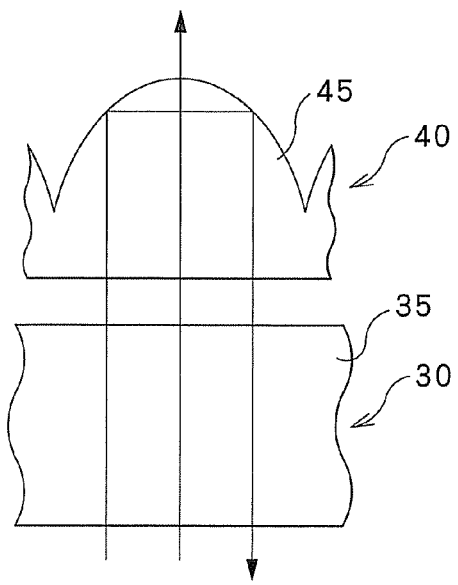
FIG. 7B is a diagram for illustration of the optical action of the optical member in a region B, schematically showing the optical member in a section parallel to the main section of the second optical sheet.

FIGS. 1 through 10 are diagrams illustrating an embodiment of the present invention. Of these, FIG. 1 is a schematic perspective view of a transmission type display device and a surface light source device. FIGS. 2 and 3 are sectional views of a first optical sheet in the main section. FIG. 4 is a perspective view of an optical member. FIGS. 5 through 10 are diagrams each illustrating the action of the surface light source device or the optical member.

The transmission type display device 10 shown in FIG. 1 includes a transmission type display unit (transmission type display part) 15 and a surface light source device 20, disposed at the rear of the transmission type display unit 15, for illuminating the transmission type display unit 15 from the back.

The transmission type display unit 15 functions as a shutter which controls transmission and blocking of light from the surface light source device 20 for each pixel in order to form an image.

In this embodiment the transmission type display unit 15 is comprised of a liquid crystal panel (liquid crystal cell). Thus, the transmission type display unit 15 functions as a liquid crystal display device. The liquid crystal panel (transmission type display unit) 15 includes a pair of polarizing plates 16, 17 and a liquid crystal layer 18 sandwiched between the pair of polarizing plates. The polarizing plates 16, 17 function to resolve incident light into two orthogonal polarization components, and allow transmission of one polarization component in one direction and absorb the other polarization component in the other direction orthogonal to the one direction.

An electric field can be applied to each pixel area of the liquid crystal layer 18. The orientation of the liquid crystal layer 18 changes upon the application of electric field. A particular direction polarized light, which has passed through the lower polarizing plate 16 disposed on the light entrance side of the transmission type display unit 15, turns by 90 degrees when it passes through the liquid crystal layer 18 to which an electric field is being applied, whereas the polarized light maintains its polarization direction when it passes through the liquid crystal layer 18 to which no electric field is being applied. Thus, transmission through or absorption and blocking by the upper polarizing plate 17, disposed on the light exit side of the lower polarizing plate 16, of the particular direction polarized light which has passed through the lower polarizing plate 16, can be controlled by application or no application of an electric field to the liquid crystal layer 18.

The liquid crystal panel (transmission type display unit) 15 can thus control transmission or blocking of light from the surface light source device 20 for each pixel. The construction of the liquid crystal panel (liquid crystal cell) can be the same as a device (member) incorporated into a conventional liquid crystal display device, and hence a further detailed description thereof will be omitted.

The term "light exit side (light outgoing side, light emerging side)" herein refers to downstream side (viewer side, upper side in FIGS. 2 and 3) in the travel direction of light that travels from a light source 25 toward a viewer, passing through the transmission type display unit 15, without turning back. The term "light entrance side (light incident side, light inputting side)" herein refers to upstream side in the travel direction of light that travels from the light source 25 toward a viewer, passing through the transmission type display unit 15, without turning back.

The surface light source device 20 will now be described. As shown in FIG. 1, the surface light source device 20 includes the light source 25 and a sheet-like optical member 28 which permits transmission therethrough of light from the light source 25. The optical member 28 is disposed on the outermost light exit side of the surface light source device 20 and constitutes a light emitting surface (light exit surface). The optical member 28 lies adjacent to the lower polarizing plate 16 of the transmission type display unit 15. In the embodiment shown in FIG. 1, the surface light source device 20 is not provided with a light diffusing sheet for diffusing light.

The surface light source device 20 is constructed as a direct-type backlight unit. Thus, the light source 25 is disposed such that the light source 25 faces the light entrance side of the optical member 28. Further, the light source 25 is covered with a reflective plate 22 from the back. The reflective plate 22 is formed in a box shape having an opening (window) on the side of the optical member 28.

In this embodiment the light source 25 includes a plurality of point-like light emitters 25a. The light emitters (light emitting bodies, light emitting parts) 25a are regularly arranged on an imaginary surface. More specifically, the light emitters 25a are arranged side by side in two different directions extending parallel to an imaginary surface. Particularly in this embodiment, one arrangement direction of the light emitters 25a is perpendicular to the other arrangement direction of the light emitters 25a. Each light emitter 25a is, for example, comprised of a point-like LED. The light emitters 25a are arranged, for example, in a 7×12 matrix at 60-mm intervals.

As shown in FIG. 1, the reflective plate 22 is a member to direct light from the light source 25 toward the optical member 28. At least the inside surface of the reflective plate 22 is made of a material having a high reflectance, such as a metal.

The optical member 28 will now be described. In this embodiment the optical member 28 is constructed as a sheet-like member including a first optical sheet 30 and a second optical sheet 40 disposed on the light exit side of the first optical sheet 30. The optical member 28 is disposed opposite to the light emitters 25a of the light source 25 such that the sheet surface of the optical member 28 is parallel to the imaginary surface on which the light emitters 25a of the light source 25 are arranged.

The sheet-like optical member 28 has a function (light condensing function, light collecting function) to change the travel direction of incident light from the light source in such a manner as to condense (collect) the exiting light in the front direction, thereby enhancing the luminance in the front direction nd intensively. The sheet-shaped optical member 28 also has a function (light diffusing function) to reduce luminance variation (also called light source image) due to the construction of the light source 25, in particular the arrangement of the light emitters 25a, and equalize the in-plane distribution of luminance, thereby obscuring the image of the light emitters 25a.

The terms "sheet", "film" and "plate" are not used herein to strictly distinguish them from one another. Thus, the term "sheet" includes a member which can also be called film or plate.

The term "sheet surface (film surface, plate surface)" herein refers to a surface which coincides with the planar direction of an objective sheet-like member when taking a perspective and overall view of the sheet-like member. In this embodiment the sheet surface of the first optical sheet 30, the sheet surface of the below-described first body portion 32 of the first optical sheet 30, the sheet surface of the second optical sheet 40, the sheet surface of the below-described second body portion 42 of the second optical sheet 40, the light emitting surface of the surface light source device 20, and the display surface of the transmission type display device 10 are parallel to each other.

The term "front direction" herein refers to the normal direction nd (see e.g. FIG. 2) of the sheet surface of the optical member 28, and coincides with the normal direction of the sheet surface of the first optical sheet 30, the normal direction of the sheet surface of the optical sheet 40, the normal direction of the light emitting surface of the surface light source device 20, etc.

The terms used herein to specify shapes or geometric conditions, such as "parallel", "perpendicular", "symmetrical", etc., should not be bound to their strict sense, and should be construed to include equivalents or resemblances from which the same optical function or effect can be expected.

The first optical sheet 30 disposed on the light entrance side will be described first. As shown in FIGS. 1 and 2, the first optical sheet 30 includes a first sheet-like body portion 32 and a first lens portion 34 positioned on the light exit side of the first body portion 32. The first lens portion 34 includes a large number of first unit shaped elements (unit optical elements, unit lenses) 35 arranged side by side on the light exit-side surface 32a of the first sheet-like body portion 32. In this embodiment the first unit shaped elements 35 are arranged, with no space therebetween, on the light exit-side surface 32a of the first body portion 32. Thus, the light emitting surface 30a of the first optical sheet 30 is constituted solely by the light exit surface 35a of the first unit shaped elements 35.

Such first optical sheet 30 performs both the above-described light condensing function (light collecting function) and light diffusing function. The first optical sheet 30 performs the light condensing function mainly in a plane parallel to the arrangement direction of the first unit shaped elements 35. Thus, the light condensing function of the first optical sheet 30 affects the angular distribution of luminance mainly in a plane parallel to the arrangement direction of the first unit shaped elements 35.

The term "lens" herein includes a lens in the narrow sense, having a curved surface(s) such as a spherical surface, and a so-called prism having flat surfaces, and also broadly includes an optical element having a curved surface(s) and a flat surface(s).

FIGS. 2 and 3 show the first optical sheet 30 in a section (also referred to as "the main section of the first optical sheet") which is parallel both to the normal direction nd of the sheet surface of the first body portion 32 of the first optical sheet 30 and to the arrangement direction of the first unit shaped elements 35. The section shown in FIGS. 2 and 3 corresponds to the section taken along the line II-II of FIG. 1.

As shown in FIGS. 2 and 3, the first body portion 32 functions as a sheet-like member to support the first unit shaped elements 35. As shown in FIGS. 2 and 3, in this embodiment the first unit shaped elements 35 are arranged side by side, with no space therebetween, on the light exit-side surface 32a of the first body portion 32 and constitute the first lens portion 34 on the first body portion 32. On the other hand, as shown in FIGS. 2 and 3, in this embodiment the first body portion 32 has a flat light entrance-side surface 32b, opposite to the light exit-side surface 32a and constituting the light entrance surface 30b of the first optical sheet 30.

The term "flat" herein refers to providing a low dispersion of normal incident light or having a low haze value as compared to the light exit-side surface 32a, and includes a case where a mat or the like is provided to obscure a scratch or the like. The haze value of the light entrance surface 30b is generally not more than 60, preferably not more than 30.

The first unit shaped elements 35 will now be described in detail. As shown in FIG. 1, the first unit shaped elements 35 extend linearly in a direction intersecting the arrangement direction of the first unit shaped elements 35. Particularly in this embodiment, the first unit shaped elements 35 extend in a straight line. Further, the longitudinal direction of the first unit shaped elements 35 is perpendicular to the arrangement direction of the first unit shaped elements 35 on a surface parallel to the sheet surface of the first body portion 32. As shown in FIG. 1, the arrangement direction of the first unit shaped elements 35 is parallel to one arrangement direction of the light emitters 25a of the light source 25 and perpendicular to the other arrangement direction of the light emitters 25a of the light source 25. In other words, the longitudinal direction of the first unit shaped elements 35 is perpendicular to the one arrangement direction of the light emitters 25a of the light source 25 and parallel to the other arrangement direction of the light emitters 25a of the light source 25.

As shown in FIG. 1, in this embodiment the sectional shape of each first unit shaped element 35 in the main section of the first optical sheet is constant along the longitudinal direction (direction in which the first unit shaped element 35 extends linearly) of the first unit shaped element 35. Further, the first unit shaped elements 35, constituting the first lens portion 34 of the first optical sheet 30, all have the same construction. The sectional shape in the main section of each first unit shaped element 35 of the first optical sheet 30 will be described in more detail below.

As shown in FIGS. 2 and 3, in this embodiment each first unit shaped element 35 has a tapered sectional shape in the main section of the first optical sheet. That is to say, in the main section of the first optical sheet, the width of each first unit shaped element 35, along a direction parallel to the sheet surface of the first body portion 32, decreases with distance from the first body portion 32 in the normal direction nd of the first body portion 32.

In the main section of the first optical sheet, the contour of each first unit shaped element 35 is a shape that can be approximated by a circular arc, an elliptical arc, a straight line, or a combination thereof. Particularly in this embodiment, the sectional shape of each first unit shaped element 35 in the main section of the first optical sheet corresponds to part of an ellipse or part of a circle. In this embodiment the contour of each first unit shaped element 35 in the main section of the first optical sheet is symmetrical with respect to a symmetry axis which is parallel to the normal direction nd of the first body portion 32. Therefore, the angular distribution of luminance on the light exit surface 30a of the first optical sheet 30 is approximately symmetrical with respect to the front direction in a plane parallel to the arrangement direction of the first unit shaped elements 35.

As shown in FIG. 3, in the main section of the first optical sheet, the angle $\theta a1$ (also referred to as "light exit surface angle") of a tangent TL to the contour of each first unit shaped element 35 with respect to the sheet surface of the first optical sheet 30 (the light exit-side surface 32a of the first body portion 32 in this embodiment) increases as the tangent point TP between the tangent TL and the first unit shaped element 35 moves from the top 35b1 of the contour (light exit surface) 35a of the first unit shaped element 35, the farthest point from the first body portion 32 in the normal direction nd of the first body portion 32, toward either end 35b2 of the contour (light exit surface) 35a of the first unit shaped element 35 adjacent to the first body portion 32 in the normal direction nd of the first body portion 32. The term "increase" in the light exit surface angle $\theta a1$ herein not only refers to continuously increase in the light exit surface angle $\theta a1$ (as in this embodiment as shown in FIGS. 2 and 3) but also includes a case where there is no change in the light exit surface angle $\theta a1$ at least in a certain contour region. Thus, the "increase" in the light exit surface angle $\theta a1$ herein implies that there is "no decrease" in the light exit surface angle $\theta a1$ as the tangent point TP moves from the top 35b1 of the contour (light exit surface) 35a toward either end 35b2 of the contour (light exit surface) 35a.

Further, in this embodiment, each first unit shaped element 35 is formed such that the proportion of a contour region in the entire length of the contour 35a of the first unit shaped element 35 in the main section of the first optical sheet, in which region the angle (light exit surface angle) $\theta a1$ between a tangent TL to the contour 35a of the first unit shaped element 35 and the sheet surface of the first optical sheet 30 satisfies the following formulae (15) and (16), is not less than 10% and not more than 70%:

$$-10° \leq \text{Arcsin}((n1) \times \sin((\theta a1)-(\theta ia1)))-(\theta a1) \leq 10° \quad (15)$$

$$(\theta ia1) = \text{Arcsin}((1/(n1)) \times (\sin(\text{Arctan}((d1a)/2/(h1))))) \quad (16)$$

wherein h1 represents the distance from the first optical sheet 30 to the light emitters 25a of the light source 25 (to the center of each light emitter 25a when the size of the light emitter is not negligible) in the main section of the first optical sheet and in the normal direction nd of the first optical sheet 30, d1a represents the distance between two adjacent light emitters 25a (distance between the centers of two adjacent light emitters when the size of each light emitter is not negligible) in the arrangement direction of the first unit shaped elements 35, and n1 represents the refractive index of the first optical sheet 30.

Such first optical sheet 30 can secure the direction of light, exiting the first optical sheet 30, within the angular range of ±10° around the front direction at a position facing the midpoint CP between two light emitters 25a adjacent to each other in the arrangement direction of the first unit shaped elements 35. This makes it possible to secure the direction of exiting light within the angular range of ±10° around the front direction at any position between two light emitters 25a adjacent to each other in the arrangement direction of the first unit shaped elements 35, as shown in FIG. 2. This can prevent decrease in luminance in an intermediate region between two light emitters 25a of the light source 25 in a direction parallel to the arrangement direction of the first unit shaped elements 35.

Further, in this embodiment, each first unit shaped element 35 is formed such that the proportion of a contour region in the entire length of the contour 35a of the first unit shaped element 35 in the main section of the first optical sheet, in which region the angle (light exit surface angle) θa1 between a tangent TL to the contour 35a of the first unit shaped element 35 and the sheet surface of the first optical sheet 30 satisfies the following formulae (17) and (18), is not less than 30% and not more than 70%:

$$\text{Arccos}(\cos(\theta ib1) \times \cos(\theta a1)) \leq \text{Arcsin}((1/(n1))) \quad (17)$$

$$(\theta ib1) = \text{Arcsin}((1/(n1)) \times (\sin(\text{Arctan}((d1b)/2/(h1))))) \quad (18)$$

wherein h1 represents the distance from the first optical sheet 30 to the light emitters 25a of the light source 25 in the main section of the first optical sheet and in the normal direction nd of the first optical sheet 30, d1b represents the distance between two adjacent light emitters 25a (distance between the centers of two adjacent light emitters when the size of each light emitter is not negligible) in the longitudinal direction of the first unit shaped elements 35, and n1 represents the refractive index of the first optical sheet 30.

According to such first optical sheet 30, total reflection of light at the light exit surface 35a of the first unit shaped elements 35 can be suppressed at a position facing the midpoint between two light emitters 25a adjacent to each other in the longitudinal direction of the first unit shaped elements 35. It therefore becomes possible for light, traveling linearly and directly from a light emitter 25a toward such a region of the first optical sheet 30, to exit the first optical sheet 30 from the region and travel toward the viewer side. As will be described later, the travel direction of light, which has exited the first optical sheet 30 from a region facing the midpoint between two light emitters 25a adjacent to each other in the longitudinal direction of the first unit shaped elements 35, is changed by the second unit shaped elements 45 of the second optical sheet 40 such that the angle between the travel direction and the front direction becomes smaller. Thus, it becomes possible to prevent decrease in luminance in an intermediate region between two light emitters 25a of the light source 25 in a direction parallel to the longitudinal direction of the first unit shaped elements 35.

Further, in the main section of the first optical sheet, the contour region of each first unit shaped element 35 in which the light exit surface angle θa1 is not less than 55°, preferably accounts for not less than 20% of the entire length of the contour of the first unit shaped element 35. This can enhance the luminance in an intermediate region between two light emitters 25a of the light source 25, thereby making the in-plane distribution of luminance uniform.

With reference to the first unit shaped elements 35 having the above construction, the arrangement pitch P1 (corresponding to the width of each first unit shaped element 35 in this embodiment, see FIG. 4) of the first unit shaped elements in the arrangement direction of the first unit shaped elements 35 may be, for example, 1 μm to 500 μm. The height H1 (see FIG. 4) of the first unit shaped elements 35 from the light exit-side surface 32a of the first body portion 32 in the normal direction nd of the sheet surface of the first optical sheet 30 may be, for example, 0.25 μm to 250 μm.

The first optical sheet 30 can be easily produced e.g. by extrusion processing or by shaping the first unit shaped elements 35 on a substrate. While a variety of materials can be used for the first optical sheet 30, it is preferred to use those materials which are widely used for optical sheets (light condensing sheets) to be incorporated into display devices, have excellent mechanical properties, optical properties, stability and processability, and are commercially available at low prices. Examples of such materials include a transparent resin mainly comprising at least one of acrylate, styrene, polycarbonate, polyethylene terephthalate, acrylonitrile, etc., and a reactive resin (e.g. ionizing radiation curable resin) such as an epoxy acrylate resin or a urethane acrylate resin. When using such materials which are widely used for optical sheets (light condensing sheets) to be incorporated into display devices, the first unit shaped elements 35 of the resulting optical sheet will have a refractive index in the range of 1.45 to 1.65.

The second optical sheet 40 of the optical member 28 will now be described. The second optical member 40 is a sheet-like member having the above-described light condensing function (light collecting function), i.e. a function to change the travel direction of incident light from the light source in such a manner as to condense the exiting light in the front direction, thereby enhancing the luminance in the front direction (normal direction) nd intensively. The second optical sheet 40 performs the light condensing function mainly in a direction intersecting the arrangement direction of the first unit shaped elements 35 of the first optical sheet 30. Thus, the light condensing function of the first optical sheet 40 affects the angular distribution of luminance mainly in a plane intersecting the arrangement direction of the first unit shaped elements 35 of the first optical sheet 30. Various types of sheet-like members that can perform the above-described light condensing function may be used as the second optical sheet 40. The second optical sheet 40 of this embodiment, shown in FIGS. 1 and 4, is merely one example and has approximately the same construction as the above-described first optical sheet 30.

As shown in FIG. 1, the second optical sheet 40 of this embodiment includes a second sheet-like body portion 42 and a second lens portion 44 positioned on the light exit side of the second body portion 42. The second lens portion 44 includes a large number of second unit shaped elements (unit optical elements, unit lenses) 45 arranged side by side on the light exit-side surface 42a of the second sheet-like body portion 42. In this embodiment the second unit shaped elements 45 are arranged, with no space therebetween, on the light exit-side surface 42a of the second body portion 42. Thus, the light emitting surface of the second optical sheet 40 is constituted solely by the light exit surface of the second unit shaped elements 45.

The second unit shaped elements 45 are arranged side by side on the light exit-side surface 42a of the second sheet-like body portion 42. As shown in FIG. 1, the second unit shaped elements 45 extend linearly in a direction intersecting the arrangement direction of the second unit shaped elements 45. Particularly in this embodiment, the second unit shaped elements 45 extend in a straight line. Further, the longitudinal direction of the second unit shaped elements 45 is perpendicular to the arrangement direction of the second unit shaped elements 45 on a surface parallel to the sheet surface of the second body portion 42.

As shown in FIG. 4, the arrangement direction of the second unit shaped elements 45 of the second optical sheet 40 intersects the arrangement direction of the first unit shaped elements 35 of the first optical sheet 30. In this embodiment the arrangement direction of the second unit shaped elements 45 of the second optical sheet 40 is perpendicular to the arrangement direction of the first unit shaped elements 35 of the first optical sheet 30. The arrangement direction of the second unit shaped elements 45 is perpendicular to one arrangement direction of the light emitters 25a of the light source 25 and parallel to the other arrangement direction of the light emitters 25a of the light source 25. In other words, the longitudinal direction of the second unit shaped elements 45 is parallel to the one arrangement direction of the light emitters 25a of the light source 25 and perpendicular to the other arrangement direction of the light emitters 25a of the light source 25.

In a section (also referred to as "the main section of the second optical sheet") which is parallel both to the normal direction nd of the second optical sheet 40 and to the arrangement direction of the second unit shaped elements 45, the sectional shape of the second unit shaped elements 45 may be suitably structured, similarly to the first unit shaped elements 35 shown in FIGS. 2 and 3. As can be seen from FIG. 1, particularly in this embodiment, the sectional shape of each second unit shaped element 45 in the main section of the second optical sheet corresponds to part of an ellipse or part of a circle. The sectional shape of each second unit shaped element 45 in the main section of the second optical sheet is constant along the longitudinal direction (direction in which the second unit shaped element 45 extends linearly) of the second unit shaped element 45. In this embodiment the contour of each second unit shaped element 45 in the main section of the second optical sheet is symmetrical with respect to a symmetry axis which is parallel to the normal direction nd of the second body portion 42. Further, the second unit shaped elements 45, constituting the second lens portion 44, all have the same construction. The present invention, however, is not limited to the illustrated second optical sheet; it is possible to suitably modify the construction of the second unit shaped elements 45 depending on the construction of a component(s), other than the second optical sheet 40, of the surface light source device 20, e.g. the construction of the light source 25.

As can be seen from FIG. 4, in the main section of the second optical sheet, the angle θa2 (also referred to as "light exit surface angle") of a tangent TL to the contour of each second unit shaped element 45 with respect to the sheet surface of the second optical sheet 40 (the light exit-side surface 42a of the second body portion 42 in this embodiment) increases as the tangent point TP between the tangent TL and the second unit shaped element 45 moves from the top 45b1 of the contour (light exit surface) 45a of the second unit shaped element 45, the farthest point from the second body portion 42 in the normal direction nd of the second body portion 42, toward either end 45b2 of the contour (light exit surface) 45a of the second unit shaped element 45 adjacent to the second body portion 42 in the normal direction nd of the second body portion 42. The term "increase" in the light exit surface angle θa2 herein not only refers to continuously increase in the light exit surface angle θa2 but also includes a case where there is no change in the light exit surface angle θa2 at least in a certain contour region. Thus, the "increase" in the light exit surface angle θa2 herein implies that there is "no decrease" in the light exit surface angle θa2 as the tangent point TP moves from the top 45b1 of the contour (light exit surface) 45a toward either end 45b2 of the contour (light exit surface) 45a.

Further, in this embodiment, each second unit shaped element 45 is formed such that the proportion of a contour region in the entire length of the contour of the second unit shaped element 45 in the main section of the second optical sheet, in which region the angle (light exit surface angle) θa2 between a tangent TL to the contour of the second unit shaped element 45 and the sheet surface of the second optical sheet 40 satisfies the following formulae (19) and (20), is not less than 10% and not more than 70%:

$$-10° \leq \text{Arcsin}((n2) \times \sin((\theta a2)-(\theta ia2)))-(\theta a2) \leq 10° \quad (19)$$

$$(\theta ia2) = \text{Arcsin}((1/(n2)) \times (\sin(\text{Arctan}((d2a)/2/(h2))))) \quad (20)$$

wherein h2 represents the distance from the second optical sheet 40 to the light emitters 25a of the light source 25 (to the center of each light emitter 25a when the size of the light emitter is not negligible) in the main section of the second optical sheet and in the normal direction nd of the second optical sheet 40, d2a represents the distance between two adjacent light emitters 25a in the arrangement direction of the second unit shaped elements 45 (in this embodiment the distance d2a is equal to the distance d1b between two adjacent light emitters 25a in the longitudinal direction of the first unit shaped elements 35), and n2 represents the refractive index of the second optical sheet 40.

Even if the first optical sheet 30 is not provided, the second optical sheet 40 can secure the direction of exiting light within the angular range of ±10° around the front direction at a position facing the midpoint between two light emitters 25a adjacent to each other in the arrangement direction of the second unit shaped elements 45. This makes it possible, even if the first optical sheet 30 is not provided, to secure the direction of exiting light within the angular range of ±10° around the front direction at any position between two light emitters 25a adjacent to each other in the arrangement direction of the second unit shaped elements 45. In this embodiment the first optical sheet 30 satisfies the formulae (17) and (18) in its region lying between two light emitters 25a adjacent to each other in the arrangement direction of the second unit shaped elements 45. Thus, a certain amount of exiting light is ensured in a region between two light emitters 25a adjacent to each other in the arrangement direction of the second unit shaped elements 45. The provision of the two optical sheets can thus ensure a high front direction luminance in the region between two light emitters 25a adjacent to each other in the arrangement direction of the second unit shaped elements 45.

In the main section of the second optical sheet, the contour region of each second unit shaped element 45, in which the light exit surface angle θa2 is not less than 55°, preferably accounts for not less than 25% of the entire length of the contour of the second unit shaped element 45. This can enhance the luminance in regions between the light emitters 25a of the light source 25, thereby making the in-plane distribution of luminance uniform.

With reference to the second unit shaped elements 45 having the above construction, the arrangement pitch P2 (corresponding to the width of each second unit shaped element 45 in this embodiment, see FIG. 4) of the second unit shaped elements 45 in the arrangement direction of the second unit shaped elements 45 may be, for example, 1 μm to 200 μm. The height H2 (see FIG. 4) of the second unit shaped elements 45 from the light exit-side surface 42a of the second body portion 42 in the normal direction nd of the sheet surface of the second optical sheet 40 may be, for example, 0.25 μm to 150 μm. Such second optical sheet 40 can be produced by the same method, and with the use of the same material as described above with reference to the first optical sheet 30.

In this embodiment the ratio of the height H1 of the first unit shaped elements 35 from the first body portion 32 relative to the arrangement pitch P1 of the first unit shaped elements 35 is smaller than the ratio of the height H2 of the second unit shaped elements 45 from the second body portion 42 relative to the arrangement pitch P2 of the second unit shaped elements 45. Therefore, on the whole, the light exit surface angle θa1 of the first unit shaped elements 35 tends to be smaller than the light exit surface angle θa2 of the second unit shaped elements 45. In particular, it is preferred that the ratio of the height H2 of the second unit shaped elements 45 from the second body portion 42 relative to the arrangement pitch P2 of the second unit shaped elements 45 be not less than 1.1 times and not more than 1.5 times the ratio of the height H1 of the first unit shaped elements 35 from the first body portion 32 relative to the arrangement pitch P1 of the first unit shaped elements 35.

Further in this embodiment, the proportion of the contour region of each first unit shaped element 35, in which the light exit surface angle θa1 satisfies the above formulae (17) and (18), in the entire length of the contour of the first unit shaped element 35 in the main section of the first optical sheet, is larger than the proportion of a contour region in the entire length of the contour of each second unit shaped element 45 in the main section of the second optical sheet, in which region the angle (light exit surface angle) θa2 between a tangent TL to the contour of the second unit shaped element 45 and the sheet surface of the second optical sheet 40 satisfies the following formulae (21) and (22):

$$\mathrm{Arccos}(\cos(\theta ib2) \times \cos(\theta a2)) \le \mathrm{Arcsin}((1/(n2))) \quad (21)$$

$$(\theta ib2) = \mathrm{Arcsin}((1/(n2)) \times (\sin(\mathrm{Arctan}((d2b)/2/(h2))))) \quad (22)$$

wherein h2 represents the distance from the second optical sheet 40 to the light emitters 25a of the light source 25 (to the center of each light emitter 25a when the size of the light emitter is not negligible) in the main section of the second optical sheet and in the normal direction nd of the second optical sheet 40, d2b represents the distance between two adjacent light emitters 25a in the longitudinal direction of the second unit shaped elements 45 (in this embodiment the distance d2b is equal to the distance d1a between two adjacent light emitters 25a in the arrangement direction of the first unit shaped elements 35), and n2 represents the refractive index of the second optical sheet 40.

As with the above-described case where the formulae (17) and (18) are satisfied by the first optical sheet 30, when the formulae (21) and (22) are satisfied by the second optical sheet 40, total reflection of light at the light exit surface 45a of the second unit shaped elements 45 can be suppressed at a position facing the midpoint between two light emitters 25a adjacent to each other in the longitudinal direction of the second unit shaped elements 45.

According to the above-described construction, a certain amount of exiting light can be ensured in those regions of the light exit surface 30a of the first optical sheet 30 which each face the midpoint between two light emitters 25a adjacent to each other in the longitudinal direction of the first unit shaped elements 35. Further, the second optical sheet 40 has a relatively superior light condensing function, making it possible to condense light, exiting those regions of the first optical sheet 30, in a narrow angular range around the front direction.

The operations of the optical member 28, the surface light source device 20 and the transmission type display device 10 will now be described.

First, the overall operation of the transmission type display device 10 and the surface light source device 20 will be described.

Light emitted by the light emitters 25a of the light source 25 travels toward the viewer side directly or after reflecting on the reflective plate 22. The light, traveling toward the viewer side, enters the first optical sheet 30 of the optical member 28.

As shown in FIG. 2, lights L21 to L23 and L25 to L28, exiting the first optical sheet 30 from the first unit shaped elements 35, are refracted at the light exit surface (lens surface) 35a of the first unit shaped elements 35. Due to the refraction, the lights L21 to 28, each traveling in a direction inclined from the front direction nd, are bent such that the angle of the travel direction (exit direction) of each light with respect to the normal direction nd of the sheet surface of the first optical sheet 30 becomes smaller. Owing to such effect of the first optical sheet 30, the first unit shaped elements 35 can condense (collect) transmitted light in the front direction nd. The first unit shaped elements 35 thus exert a light condensing effect on transmitted light.

The change in the travel direction of light before entering the first optical sheet 30 and after exiting the first optical sheet 30 is larger for light that enters the first optical sheet 30 at a larger angle of inclination with respect to the front direction nd (e.g. lights L21, L25 in FIG. 2). Thus, the light condensing effect of the first unit shaped elements 35 is exerted more effectively on light traveling at a larger angle of inclination with respect to the front direction nd.

As shown in FIG. 2, with reference to light, such as the lights L21 to L28, which enters the first optical sheet 30 directly from the light emitters 25a of the light source 25, i.e. light except one that enters the first optical sheet 30 after reflecting on the reflective plate 22, the incident angle of light from a light emitter 25a with respect to the first optical sheet 30 increases with distance of the incident position on the first optical sheet 30 from the light emitter 25a in a direction parallel to the sheet surface of the first optical sheet 30. Thus, with reference to source light that travels in a straight line and enters the first optical sheet 30 directly from a light emitter 25a (hereinafter referred to as "direct incident light"), the angle of inclination with respect to the normal direction nd of the first optical sheet 30 increases with distance of the incident position from the light emitter 25a. The light condensing effect of the first optical sheet 30 can thus be effectively exerted on light that enters a region at a distance from the light emitter 25a of the light source 25.

On the other hand, as shown in FIG. 2, light L24, traveling at a small angle of inclination with respect to the front direction nd, can repeat total reflection at the light exit surface (lens surface) of a first unit shaped element 35 and turn toward the light entrance side (light source side). Therefore, the luminance can be prevented from becoming too high in a region, lying right above a light emitter 25a of the light source 25, where light from the light emitter 25a directly enters at a small incident angle.

The optical effect of the first unit shaped elements 35 on transmitted light thus differs depending on the distance of the incident position from the light emitter 25a of the light source 25. This can effectively reduce luminance variation produced by the arrangement of the light emitters 25a of the light source 25 and obscure the image of the light source. Thus, the first optical sheet 30 also has a light diffusing function to equalize the in-plane distribution of luminance.

The exit angle of light exiting the first optical sheet 30 is thus narrowed down to fall within a narrow angular range around the front direction in a plane parallel to the arrangement direction of the first unit shaped elements 35 of the first optical sheet 30.

Light that has exited the first optical sheet 30 enters the second optical sheet 40 of the optical member 28. As with the effect of the first optical sheet 30 (e.g. on the lights L26 to L28 of FIG. 2), the second optical sheet 40 exerts a light condensing effect on transmitted light through its refraction at the light exit surface of the second unit shaped elements 45. Thus, the second optical sheet 40 exerts an additional light condensing effect on light that has been condensed by the first optical sheet 30.

Light whose travel direction is significantly changed by the second optical sheet 40 is mainly a light component which travels parallel to the main section of the second optical sheet 40, and thus differs from the light component condensed by the first optical sheet 30. In particular, the second optical sheet 40 condenses light in a narrow angular range around the front direction in a plane parallel to the arrangement direction of the second unit shaped elements 45, whereas the first optical sheet 30 condenses light in a narrow angular range around the front direction in a plane parallel to the arrangement direction of the first unit shaped elements 35. Accordingly, the front direction luminance, which has been enhanced by the first optical sheet 30, is not impaired but can be further enhanced by the optical effect of the second optical sheet 40.

Light that has exited the optical member 28, consisting of the first optical sheet 30 and the second optical sheet 40, enters the lower polarizing plate 16 of the transmission type display unit 15. The lower polarizing plate 16 allows one polarization component of incident light to pass though and absorbs the other polarization component. Light that has passed through the lower polarizing plate 16 selectively passes through the upper polarizing plate 17 depending on the application of an electric field to each pixel. By thus selectively transmitting light from the surface light source device 20 for each pixel by means of the transmission type display unit 15, a viewer can view images on the transmission type display device 10.

The effect of the optical member 28, consisting of the first optical sheet 30 and the second optical member 40, on light from the light source 25 will now be described in more detail with reference mainly to FIGS. 5 through 10. The following description will be given of light (direct incident light) which travels linearly and directly from each light emitter 25a of the light source 25 toward the first optical sheet 30, because it is such direct incident light that significantly affects the in-plane distribution of luminance in the light exit surface of the surface light source device 20. FIGS. 6A, 7A, 8A and 9A are diagrams for illustration of the optical action of the optical member 28 in various regions, schematically showing the optical member 28 in a section parallel to the main section of the first optical sheet. On the other hand, FIGS. 6B, 7B, 8B and 9B are diagrams for illustration of the optical action of the optical member 28 in various regions, schematically showing the optical member 28 in a section parallel to the main section of the second optical sheet.

A description will be first given of the optical action of the optical member 28 in a region A (see FIG. 5) lying right above each light emitter 25a of the light source 25. As described above and as shown in FIGS. 6A and 2, when direct incident light enters a region, having a large light exit surface angle $\theta a1$ or $\theta a2$, of the first optical sheet 30 or the second optical sheet 40, the light is totally reflected at the light exit surface of the unit shaped elements 35 or 45. Consequently, the light is returned to the light source 25 side without exiting the optical member 28 and traveling toward the viewer side. Such light can re-enter the optical member 28 by reflection e.g. from the reflective plate 22. By the total reflection action of the first optical sheet 30 and the second optical sheet 40, the luminance of the light exit surface of the optical member 28 is prevented from becoming too high in the region A lying right above each light emitter 25a.

The light exit surface angles $\theta a1$, $\theta a2$ at the tops $35b1$ of the first unit shaped elements 35 and the second unit shaped elements 45 are 0°. Accordingly, part of direct incident light entering the region A can pass through the first optical sheet 30 and the second optical sheet 40 without a change in the travel direction. While the transmittance is low in the region A, the amount of direct incident light entering the region A is relatively large. Therefore, the luminance of the light exit surface of the optical member 28 will not be too low in the region A lying right above each light emitter 25a.

A description will now be given of the optical action of the optical member 28 in a region B (see FIG. 5) facing an intermediate region between two light emitters 25a adjacent to each other in the arrangement direction of the first unit shaped elements 35. Direct incident light that enters the region B travels approximately parallel to the main section of the first optical sheet. Thus, the light condensing effect and the light diffusing effect of the first lens portion 34 of the first optical sheet 30 can be most effectively exerted on light that enters the region B.

In this embodiment the first optical sheet 30 is designed to satisfy the above formulae (15) and (16). Thus, at least 10% of light, emitted by one of two light emitters 25a adjacent to each other in the arrangement direction of the first unit shaped elements 35 and traveling linearly and directly to a first unit shaped element 35 that faces the midpoint CP between the two adjacent light emitters 25a, is refracted at the light exit surface 35a of the first unit shaped element 35 and exits in a direction which falls within the angular range of ±10° around the front direction.

The following is a study of the exit angle $\theta z$ (angle of the travel direction of light exiting the first optical sheet 30 with respect to the normal direction nd of the first optical sheet 30) of light which is emitted by one of two light emitters 25a adjacent to each other in the arrangement direction of the first unit shaped elements 35 and exits the first optical sheet 30 through a first unit shaped element 35 that faces the midpoint CP between the two adjacent light emitters 25a. First, the approach angle $\theta ia1$ (angle of the direction of light traveling in the first optical sheet 30 with respect to the normal direction nd of the first optical sheet 30) of direct incident light that has entered the first optical sheet 30 at a position facing the midpoint CP between the two adjacent light emitters 25a can be determined. Next, the exit angle $\theta z$ of the light exiting the first optical sheet 30 can be determined by using the approach angle $\theta ia1$.

In particular, the incident angle θd of direct incident light which is emitted by one of two light emitters 25*a* adjacent to each other in the arrangement direction of the first unit shaped elements 35 and enters the first optical sheet 30 through the light entrance surface 30*b* at a position facing the midpoint CP between the two adjacent light emitters 25*a*, as shown in FIG. 3, is represented by the following formula (23). With reference to refraction of the light at the light entrance surface 30*b* of the first optical sheet 30, the following formula (24) holds in accordance with the Snell's law. The above formula (16) is derived from the formulae (23) and (24).

$$(\theta d) = \text{Arctan}((d1a)/2/(h1)) \tag{23}$$

$$\sin(\theta d) = (n1) \times \sin(\theta ia1) \tag{24}$$

$$(\theta ia1) = \text{Arcsin}((1/(n1)) \times (\sin(\text{Arctan}((d1a)/2/(h1))))) \tag{16}$$

Similarly, the above formula (18) can be obtained in the same manner, whereby the approach angle θib1 (see FIG. 10) of direct incident light that has entered the first optical sheet 30 at a position facing the midpoint between two light emitters 25*a* adjacent to each other in the longitudinal direction of the first unit shaped elements 35, can be determined. Further, on the assumption of the absence of the first optical sheet 30, the above formula (20) can be obtained in the same manner, whereby the approach angle θia2 of direct incident light that has entered the second optical sheet 40 at a position facing the midpoint between two light emitters 25*a* adjacent to each other in the arrangement direction of the second unit shaped elements 45, can be determined. Furthermore, on the assumption of the absence of the first optical sheet 30, the above formula (22) can be obtained in the same manner, whereby the approach angle θib2 of direct incident light that has entered the second optical sheet 40 at a position facing the midpoint between two light emitters 25*a* adjacent to each other in the longitudinal direction of the second unit shaped elements 45, can be determined.

Next, with reference to refraction of the light at the lens surface (contour) 35*a* of the unit shaped element 35, the following formula (25) holds in accordance with the Snell's law. In the formula (25), the angle ex represents the incident angle of the light with respect to the lens surface (contour) 35*a* of the unit shaped element 35, and the angle θy represents the exit angle of the light with respect to the lens surface (contour) 35*a* of the unit shaped element 35, as shown in FIG. 3. As can be seen from FIG. 3, the following formula (26) holds for the incident angle θx.

$$(n1) \times \sin(\theta x) = \sin(\theta y) \tag{25}$$

$$(\theta x) = (\theta a1) - (\theta ia1) \tag{26}$$

The exit angle θz of the light which is emitted by one of two light emitters 25*a* adjacent to each other in the arrangement direction of the first unit shaped elements 35 and exits the first optical sheet 30 through the first unit shaped element 35 that faces the midpoint CP between the two adjacent light emitters 25*a*, is represented by the following formula (27). The above formula (15) is satisfied when the exit angle θz is within the angular range of ±10° around the front direction.

$$(\theta z) = (\theta y) - (\theta a1) \tag{27}$$

$$-10° \leq (\theta z) = \text{Arcsin}((n1) \times \sin((\theta ia1) - (\theta ia1))) - (\theta a1) \leq 10° \tag{15}$$

Similarly, on the assumption of the absence of the first optical sheet 30, the exit angle of the light which is emitted by one of two light emitters 25*a* adjacent to each other in the arrangement direction of the second unit shaped elements 45 and exits the second optical sheet 40 through the second unit shaped element 45 that faces the midpoint between the two adjacent light emitters 25*a*, can be determined in the same manner. The above formula (19) is satisfied when the exit angle is within the angular range of ±10° around the front direction.

As described above, in this embodiment the light exit surface angle θa1 of each first unit shaped element 35 decreases from either end 35*b*2 toward the top 35*b*1 and becomes 0° at the top 35*b*1. The light condensing effect of such first unit shaped element 35 on incident light gradually decreases from either end 35*b*2 of the light exit surface 35 toward the top 35*b*1; no light condensing effect is exerted on light incident on the top 35*b*1.

Further, as shown in FIG. 2, the approach angle θia1 (angle of the direction of light traveling in the first optical sheet 30 with respect to the normal direction nd of the first optical sheet 30, see FIGS. 2 and 3) of direct incident light from a light emitter 25*a*, entering a first unit shaped element 35, increases with distance of the first unit shaped element 35 from the light emitter 25*a*. Accordingly, the exit angle of the light, exiting the first unit shaped element 35, increases with distance of the first unit shaped element 35 from the light emitter 25*a*.

Therefore, according to the first optical sheet 30 which is designed to satisfy the above formulae (15) and (16), part of light, exiting a first unit shaped element 35 in the region B that faces an intermediate region between two light emitters 25*a* adjacent to each other in the arrangement direction of the first unit shaped elements 35, travels in a direction which falls within the angular range of ±10° around the front direction. The light exit surface 30*a* of the first optical sheet 30 can therefore maintain a high luminance in the region B.

Light that has exited the first optical sheet 30 enters the second optical sheet 40. Because the light condensing effect of the first optical sheet 30 has been effectively exerted on light traveling from the first optical sheet to the second optical sheet 40, the light traveling from the first optical sheet to the second optical sheet 40 contains a large amount of a light component that travels generally in the front direction. Thus, as with light that passes through the region A of the optical sheets 30, 40, light passes through and exits the second optical sheet 40 in the front direction without its travel direction being changed in the region where the light exit surface angle θa2 is small.

As described above, the travel direction of direct incident light can be changed in the region B by the excellent light condensing function of the first optical sheet 30 such that the exit angle of the light, exiting the first optical sheet 30, becomes smaller. Further, light, traveling generally in the front direction, passes through the second optical sheet 40 at a certain transmittance without its travel direction being changed. The luminance can thus be effectively enhanced in the region B lying between two adjacent light emitters 25*a*.

Figure 8A:
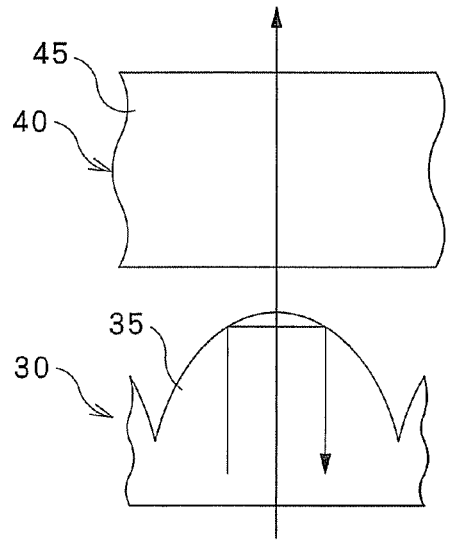
FIG. 8A is a diagram for illustration of the optical action of the optical member in a region C, schematically showing the optical member in a section parallel to the main section of the first optical sheet.
Figure 8B:
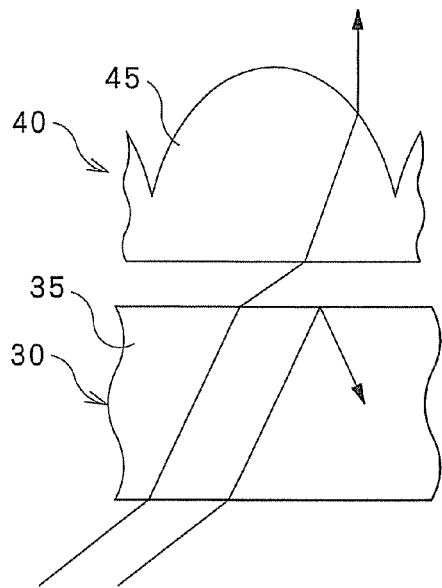
FIG. 8B is a diagram for illustration of the optical action of the optical member in a region C, schematically showing the optical member in a section parallel to the main section of the second optical sheet.

A description will now be given of the optical action of the optical member 28 in a region C (see FIG. 5) facing an intermediate region between two light emitters 25*a* adjacent to each other in the longitudinal direction of the first unit shaped elements 35. Direct incident light that enters the region C travels in a plane approximately parallel to the longitudinal direction of the first unit shaped elements 35. As shown in FIGS. 8A and 8B, direct incident light that enters the region C is inclined with respect to the main section of the first optical sheet 30. Therefore, a higher proportion of direct incident light is totally reflected compared to direct incident light that enters the first optical sheet 30 in the region A.

On the other hand, as described above, in this embodiment each first unit shaped element 35 is formed such that the proportion of a contour region in the entire length of the contour 35a of the first unit shaped element 35 in the main section of the first optical sheet, in which region the angle (light exit surface angle) θa1 between a tangent TL to the contour 35a of the first unit shaped element 35 and the sheet surface of the first optical sheet 30 satisfies the following formulae (17) and (18), is not less than 30% and not more than 70%:

$$\text{Arccos}(\cos(\theta ib1) \times \cos(\theta a1)) \leq \text{Arcsin}((1/(n1))) \quad (17)$$

$$(\theta ib1) = \text{Arcsin}((1/(n1)) \times (\sin(\text{Arctan}((d1b)/2/(h1))))) \quad (18)$$

wherein h1 represents the distance from the first optical sheet 30 to the light emitters 25a of the light source 25 (to the center of each light emitter 25a when the size of the light emitter is not negligible) in the main section of the first optical sheet and in the normal direction nd of the first optical sheet 30, d1b represents the distance between two adjacent light emitters 25a (distance between the centers of two adjacent light emitters when the size of each light emitter is not negligible) in the longitudinal direction of the first unit shaped elements 35, and n1 represents the refractive index of the first optical sheet 30.

Figure 10:
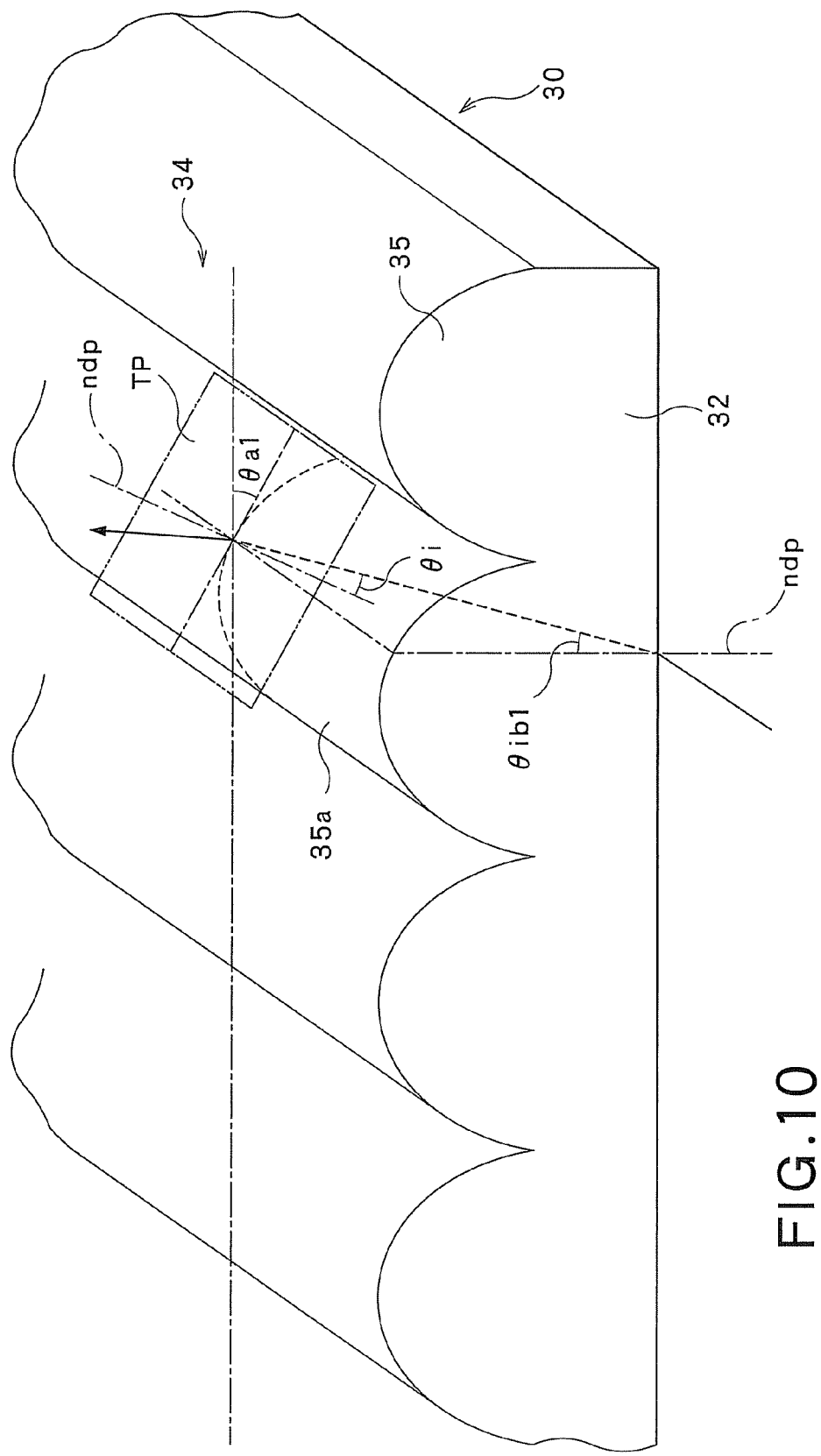
FIG. 10 is a diagram for illustration of the action of the first optical sheet, showing a perspective view of the first optical sheet.

In the formula (18), "θib1" corresponds to the approach angle (angle of the direction of light traveling in the first optical sheet 30 with respect to the normal direction nd of the first optical sheet 30, see FIG. 10) of light which travels along the longitudinal direction of the first unit shaped element 35 (travels parallel to the longitudinal direction of the first unit shaped element 35 as viewed in the normal direction nd of the first optical sheet 30) and enters the first optical sheet 30 at a position facing the midpoint between two light emitters 25a adjacent to each other in the longitudinal direction of the first unit shaped element 35. In the formula (17), "Arccos(cos(θib1)×cos(θa1))" represents the incident angle, at an exit point on the light exit surface 35a of the first unit shaped element 35 at which the light exit surface angle is θa1, of direct incident light which has entered the first optical sheet 30 at a position facing the midpoint between two light emitters 25a adjacent to each other in the longitudinal direction of the first unit shaped element 35, and travels in the first unit shaped element 35 toward the exit point on the light exit surface 35a, in other words, the angle of the travel direction of the direct incident light in the first unit shaped element 35 with respect to the normal line ndp to the tangent plane TP to the light exit surface 35a at the exit point the direct incident light enters. When the formula (17) is satisfied, the light is not totally reflected and can exit the first optical sheet 30.

In this embodiment each first unit shaped element 35 is formed such that the proportion of a contour region, in which the light exit surface angle θa1 satisfies the formulae (17) and (18), in the entire length of the contour 35a of the first unit shaped element 35 in the main section of the first optical sheet, is not less than 30% and not more than 70%. Total reflection of direct incident light can therefore be prevented in a region that accounts for at least 30% of the light exit surface 35a of each first unit shaped element 35 at a position, facing the midpoint between two light emitters 25a adjacent to each other in the longitudinal direction of the first unit shaped element 35, at which total reflection is most likely to occur. By thus adjusting the shape of each first unit shaped element 35, it becomes possible to secure a certain amount of light that can exit the first optical sheet 30 in the region C.

In the formula (22), "θib2" corresponds to the approach angle (angle of the direction of light traveling in the second optical sheet 40 with respect to the normal direction nd of the second optical sheet 40) of light which, on the assumption of the absence of the first optical sheet 30, travels along the longitudinal direction of the second unit shaped element 45 (travels parallel to the longitudinal direction of the second unit shaped element 45 as viewed in the normal direction nd of the second optical sheet 40) and enters the second optical sheet 40 at a position facing the midpoint between two light emitters 25a adjacent to each other in the longitudinal direction of the second unit shaped element 45. In the formula (21), "Arccos(cos(θib2)×cos(θa2))" represents the incident angle, at an exit point on the light exit surface 45a of the second unit shaped element 45 at which the light exit surface angle is θa2, of direct incident light which, on the assumption of the absence of the first optical sheet 30, has entered the second optical sheet 40 at a position facing the midpoint between two light emitters 25a adjacent to each other in the longitudinal direction of the second unit shaped element 45, and travels in the second unit shaped element 45 toward the exit point on the light exit surface 45a, in other words, the angle of the travel direction of the direct incident light in the second unit shaped element 45 with respect to the normal line ndp to the tangent plane TP to the light exit surface 45a at the exit point the direct incident light enters. When the formula (21) is satisfied, the light is not totally reflected and can exit the second optical sheet 40.

Light that has exited the first optical sheet 30 enters the second optical sheet 40. Light, traveling from the first optical sheet 30 to the second optical sheet 40 in the region C, travels in a plane generally parallel to the arrangement direction of the second unit shaped elements 45 (see FIG. 8A). Thus, light that enters the second optical sheet 40 in the region C is one on which the light condensing effect and the light diffusing effect of the second lens portion 44 of the second optical sheet 40 are most effectively exerted (see FIG. 8B).

Further, in this embodiment the second optical sheet 40 is designed to satisfy the above formulae (19) and (20), and therefore the optical sheet 40 has an excellent light condensing function. The second optical sheet 40 can therefore effectively change the travel direction of light that has passed through the first optical sheet 30 in the region C so as to effectively raise the front direction luminance in the region C. Thus, even when the transmittance of the first optical sheet 30 is somewhat low in the region C, the second optical sheet 40 can very effectively utilize light that has been transmitted through the first optical sheet 30, thereby ensuring the luminance in the region C.

Particularly in this embodiment, the proportion of a contour region, in which the light exit surface angle θa1 satisfies the above formulae (17) and (18), in the entire length of the contour of each first unit shaped element 35 in the main section of the first optical sheet, is larger than the proportion of a contour region, in which the light exit surface angle θa2 satisfies the above formulae (21) and (22), in the entire length of the contour of each second unit shaped element 45 in the main section of the second optical sheet. Further, in this embodiment the ratio of the height H1 of the first unit shaped elements 35 from the first body portion 32 relative to the arrangement pitch P1 of the first unit shaped elements 35 is smaller than the ratio of the height H2 of the second unit shaped elements 45 from the second body portion 42 relative to the arrangement pitch P2 of the second unit shaped elements 45. Thus, the first optical sheet 30 is designed to allow direct incident light to pass through easily in the region C without exerting a strong light condensing effect on direct incident light. The second optical sheet 40, on the other hand, is designed to exert a strong light condensing effect on direct incident light in the region C. It therefore becomes possible to very effectively enhance the luminance in the region C where the luminance is likely to be low.

A description will now be given of the optical action of the optical member 28 in a region D (see FIG. 5) which lies between two adjacent regions B and also lies between two adjacent regions C. Direct incident light that enters the region D travels in a plane inclined with respect to both the arrangement direction of the first unit shaped elements 35 and the arrangement direction of the second unit shaped elements 45.

Figure 9A:
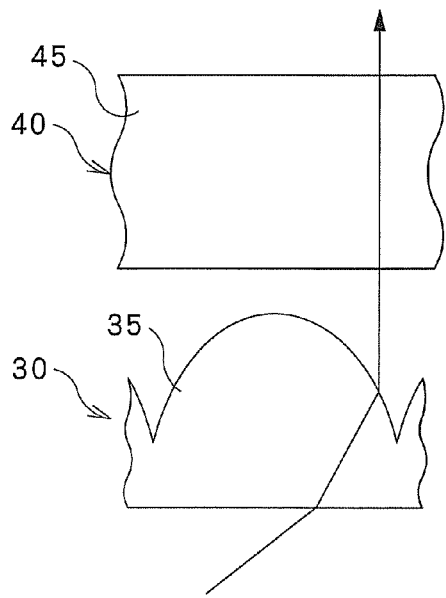
FIG. 9A is a diagram for illustration of the optical action of the optical member in a region D, schematically showing the optical member in a section parallel to the main section of the first optical sheet.
Figure 9B:
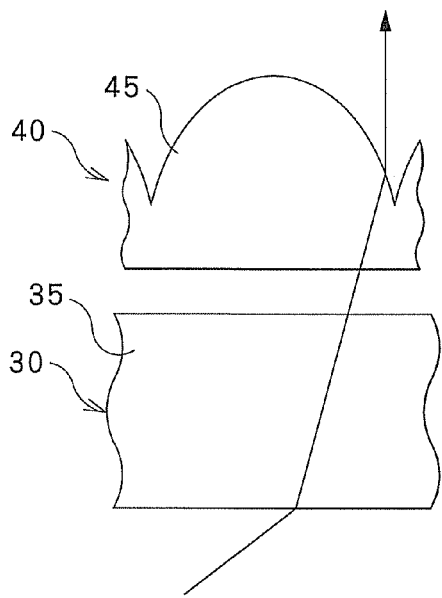
FIG. 9B is a diagram for illustration of the optical action of the optical member in a region D, schematically showing the optical member in a section parallel to the main section of the second optical sheet.

Therefore, direct incident light that enters the region D is first subject to the light condensing effect of a first unit shaped element 35 in the first optical sheet 30, as shown in FIG. 9A. The direct incident light that enters the region D travels also in the longitudinal direction of the first unit shaped elements 35. Accordingly, like light that travels in the region C, part of the direct incident light is totally reflected in the first unit shaped element 35. The transmittance of the first optical sheet 30 in the region D is higher than that in the region C.

Light that has exited the first optical sheet 30 enters the second optical sheet 40. Light, exiting the first optical sheet 30 and entering the second optical sheet 40 in the region D, is subject to the light condensing effect of a second unit shaped element 45. The transmittance of the second optical sheet 40 in the region D is higher than that in the region B.

Thus, though the amount of direct incident light that enters the region D is low, both the first optical sheet 30 and the second optical sheet 40 exert their light condensing effect on the light and, in addition, the overall transmittance of the optical member 28, consisting of the first optical sheet 30 and the second optical sheet 40, is the highest in the region C. A certain degree of luminance can therefore be ensured also in the region D.

According to this embodiment, it becomes possible to effectively enhance the luminance in a region not facing a light emitter 25a of the light source 25 and equalize the in-plane distribution of luminance while preventing a too high luminance in a region facing a light emitter 25a. This method, unlike adjustment of the distribution of luminance by the use of a light diffusion sheet, can eliminate variation of luminance due to differences in the amount of light among various positions in a plane, thereby effectively obscuring the image of a light source. It also becomes possible to reduce the light diffusing effect of a light diffusing sheet conventionally used, or to even eliminate the use of a light diffusing sheet as in this embodiment. This can increase the efficiency in the use of source light and reduce the production cost of the surface light source apparatus 20 (display device 30).

Particularly in this embodiment, the proportion of a contour region, in which the light exit surface angle θa1 satisfies the above formulae (17) and (18), in the entire length of the contour of each first unit shaped element 35 in the main section of the first optical sheet, is larger than the proportion of a contour region, in which the light exit surface angle θa2 satisfies the above formulae (21) and (22), in the entire length of the contour of each second unit shaped element 45 in the main section of the second optical sheet. This enables effective enhancement of luminance in the region C which faces an intermediate region between two light emitters 25a adjacent to each other in the longitudinal direction of the first unit shaped elements 35 of the first optical sheet 30 disposed on the light entrance side of the optical member, and which has conventionally suffered a significant lowering of luminance.

Further, in this embodiment the ratio of the height H1 of the first unit shaped elements 35 from the first body portion 32 relative to the arrangement pitch P1 of the first unit shaped elements 35 is smaller than the ratio of the height H2 of the second unit shaped elements 45 from the second body portion 42 relative to the arrangement pitch P2 of the second unit shaped elements 45. In this case the light entrance-side first optical sheet 30 exhibits an excellent transmittance and the second optical sheet 40 performs an excellent light condensing function. This enables effective enhancement of luminance in the region C which faces an intermediate region between two light emitters 25a adjacent to each other in the longitudinal direction of the first unit shaped elements 35 of the first optical sheet 30 disposed on the light entrance side of the optical member, and which has conventionally suffered from a significant lowering of luminance. In particular, it is preferred that the ratio of the height H2 of the second unit shaped elements 45 from the second body portion 42 relative to the arrangement pitch P2 of the second unit shaped elements 45 be not less than 1.1 times and not more than 1.5 times the ratio of the height H1 of the first unit shaped elements 35 from the first body portion 32 relative to the arrangement pitch P1 of the first unit shaped elements 35. An experiment by the present inventors has found no visually discernible difference in brightness between the region B and the region C of the surface light source device 20 when the ratio of the height H2 of the second unit shaped elements 45 from the second body portion 42 relative to the arrangement pitch P2 of the second unit shaped elements 45 is not less than 1.1 times and not more than 1.5 times the ratio of the height H1 of the first unit shaped elements 35 from the first body portion 32 relative to the arrangement pitch P1 of the first unit shaped elements 35. More specifically, when the ratio of the height H2 of the second unit shaped elements 45 from the second body portion 42 relative to the arrangement pitch P2 of the second unit shaped elements 45 is 1 times, 1.1 times, 1.3 times, 1.5 times and 1.8 times the ratio of the height H1 of the first unit shaped elements 35 from the first body portion 32 relative to the arrangement pitch P1 of the first unit shaped elements 35, the illuminance of the region B was 1.4 times, 1.2 times, 1.0 times, 0.85 times and 0.7 times the illuminance of the region C, respectively.

Various modifications can be made to the above-described embodiment. The following are exemplary variations.

Figure 11:
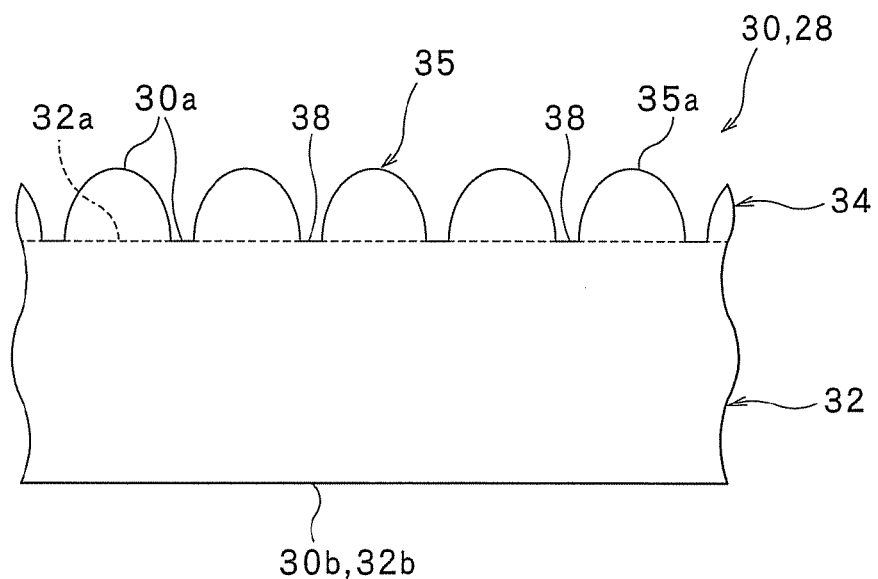
FIG. 11 is a diagram illustrating a variation of the first optical sheet in the same section as FIG. 2.
Figure 12:
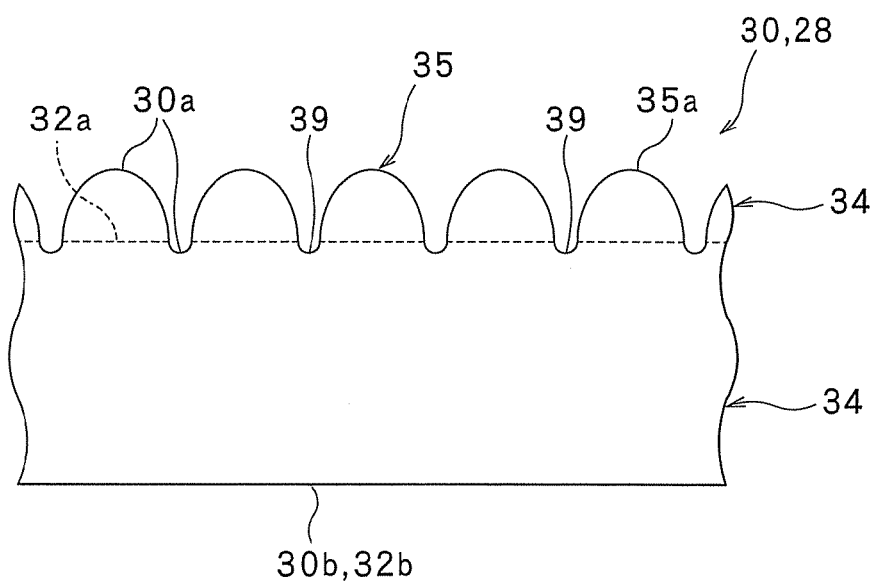
FIG. 12 is a diagram illustrating another variation of the first optical sheet in the same section as FIG. 2.

Though in the above-described embodiment the first unit shaped elements 35 are arranged side by side with no space therebetween, such arrangement is not limiting of the present invention. For example, a flat portion 38 may be formed between two adjacent first unit shaped elements 35, as shown in FIG. 11, or a recessed portion 39 may be formed between two adjacent first unit shaped elements 35, as shown in FIG. 12. Such modifications can be made not only to the first unit shaped elements 35 of the first optical sheet 30 but also to the second unit shaped elements 45 of the second optical sheet 40. In FIGS. 11 and 12 illustrating the variations, the same reference numerals are used for the same components as those of the above-described embodiment shown in FIGS. 1 to 10.

Though in the above-described embodiment the first unit shaped elements 35 of the first optical sheet 30 all have the same construction, this is not limiting of the present invention. For example, the first optical sheet 30 may contain a unit shaped element(s) having a different shape(s). Similarly, the second optical sheet 40 may contain a unit shaped element(s) having a different shape(s).

In the above-described embodiment, the arrangement of the light emitters 25a of the light source 25 of the surface light source device 20 may be arbitrarily adjusted. For example, the distance (spacing, arrangement pitch) d2a between two light emitters 25a, adjacent to each other in the arrangement direction of the second unit shaped elements 45 of the second optical sheet 40 lying on the light exit side, in the arrangement direction of the second unit shaped elements 45, may be made shorter than the distance (spacing, arrangement pitch) d1a between two light emitters 25a, adjacent to each other in the arrangement direction of the first unit shaped elements 35 of the first optical sheet 30 lying on the light entrance side, in the arrangement direction of the first unit shaped elements 35. That is to say, the distance (spacing, arrangement pitch) d1b between two light emitters 25a, adjacent to each other in the longitudinal direction of the first unit shaped elements 35 of the first optical sheet 30 lying on the light entrance side, in the longitudinal direction of the first unit shaped elements 35, may be made shorter than the distance (spacing, arrangement pitch) d2b between two light emitters 25a, adjacent to each other in the longitudinal direction of the second unit shaped elements 45 of the second optical sheet 40 lying on the light exit side, in the longitudinal direction of the second unit shaped elements 45. As described above, the luminance is likely to be lower in the region C that faces an intermediate region between two light emitters 25a adjacent to each other in the longitudinal direction of the first unit shaped elements 35 of the first optical sheet 30 lying on the light entrance side. Thus, by shortening the distance between two light emitters 25a, adjacent to each other in the longitudinal direction of the first unit shaped elements 35, in the longitudinal direction of the first unit shaped elements 35, lowering of the luminance in the region C between such two light emitters 25a can be reduced and the in-plane variation of luminance can be obscured.

The second unit shaped elements 45 of the second optical sheet 40 may comprise a base material, and a light diffusing material dispersed in the base material. As described above, the in-plane distribution of luminance can be made uniform by enhancing the light condensing function of the second unit shaped elements 45. In this case, a light component may exist which repeats total reflection on the light exit surface of the second unit shaped element 45 and passes through a surface portion of a second unit shaped element 45. Such light can produce a side lobe. The undesirable light that passes through a surface portion of a second unit shaped element 45 can be diffused and obscured by imparting a light diffusing function to the second unit shaped elements 45. It is preferred from this viewpoint that in the main section of the second optical sheet, the thickness of a portion containing the light diffusing material be not more than the arrangement pitch P2 of the second unit shaped elements 45. Further, the ratio of the refractive index of the light diffusing material of the second unit shaped elements 45 of the second optical sheet 40 relative to the refractive index of the base material of the second unit shaped elements 45 of the second optical sheet 40 is preferably not more than 0.9 or not less than 1.1. The light diffusing material may contain a gas, or may comprise a metal compound.

When imparting a light diffusing function to the first optical sheet 30 and the second optical sheet 40, the degree of light diffusion in the second unit shaped elements 45 of the second optical sheet 40 is preferably higher than the degree of light diffusion in the second body portion 42 of the second optical sheet 40, higher than the degree of light diffusion in the first unit shaped elements 35 of the first optical sheet 30, and higher than the degree of light diffusion in the first body portion 32 of the first optical sheet 30. This can prevent a separately-provided light diffusing material from impairing the light condensing function and the light diffusing function of the first optical sheet 30 and the light condensing function and the light diffusing function of the second optical sheet 40. It therefore becomes possible to equalize the in-plane distribution of luminance and obscure the image of the light source 25. The degree of light diffusion can be evaluated in terms of a value obtained by, multiplying "difference in refractive index between a base material and a light diffusing material", "the concentration (by weight) of the light diffusing material" and "the reciprocal of the average particle size of the light diffusing material". A higher value can indicate a higher degree of light diffusion.

Various modifications may be made to the above-described exemplary overall construction of the optical member 28, the surface light source device 20 and the transmission type display device 10, which incorporate the first optical sheet 30. For example, optical sheets having various functions (e.g. a light diffusing sheet) may be additionally incorporated into the optical member 28, the surface light source device 20 and the transmission type display device 10. For example, it is possible to dispose a third optical sheet, having the same shape as the first optical sheet 30, on the light exit side of the second optical sheet 40, and to dispose a fourth optical sheet, having the same shape as the second optical sheet 40, on the light exit side of the third optical sheet. Further, in order to enhance the front direction luminance, the surface light source device 20 may be provided with a reflection-type polarization separation film which allows a particular polarization component to pass through and reflects the other polarization component(s). An exemplary polarization separation film is DBEF which is available from Sumitomo 3M Ltd. When a polarization separation film is provided, the film is preferably disposed on the outermost light exit side of the surface light source device or just on the light entrance side of a member lying on the outermost light exit side of the surface light source.

The above-described modifications, of course, may also be made in an appropriate combination to the above-described embodiments.

The invention claimed is:

1. An optical member comprising:
a first optical sheet; and
a second optical sheet disposed on a light exit side of the first optical sheet,
wherein:
the first optical sheet includes a body portion, and unit shaped elements arranged on the light exit side of the body portion and each extending linearly in a direction intersecting an arrangement direction;
the second optical sheet includes a body portion, and unit shaped elements arranged on the light exit side of the body portion and each extending linearly in a direction intersecting an arrangement direction;
the first optical sheet and the second optical sheet are disposed such that the arrangement direction of the unit shaped elements of the first optical sheet intersects the arrangement direction of the unit shaped elements of the second optical sheet;
a ratio of a height H1 of the unit shaped elements of the first optical sheet from the body portion of the first optical sheet relative to an arrangement pitch P1 of the unit shaped elements of the first optical sheet is smaller than a ratio of a height H2 of the unit shaped elements of the second optical sheet from the body portion of the second optical sheet relative to an arrangement pitch P2 of the unit shaped elements of the second optical sheet,
the optical member is disposed in a position facing a light source including light emitters, and
a proportion of a contour region in an entire length of a contour of each unit shaped element of the first optical sheet in a main section which is parallel both to a normal direction of the first optical sheet and to the arrangement direction of the unit shaped elements of the first optical sheet, in which region an angle θa1 between a tangent to the contour of the unit shaped element of the first optical sheet and a sheet surface of the first optical sheet satisfies following formulae (A) and (B), is larger than a proportion of a contour region in an entire length of a contour of each unit shaped element of the second optical sheet in a main section which is parallel both to a normal direction of the second optical sheet and to the arrangement direction of the unit shaped elements of the second optical sheet, in which region an angle θa2 between a tangent to the contour of the unit shaped element of the second optical sheet and a sheet surface of the second optical sheet satisfies following formulae (C) and (D):

$$\text{Arccos}(\cos(\theta ib1) \times \cos(\theta a1)) \leq \text{Arcsin}(1/(n1)) \tag{A}$$

$$(\theta ib1) = \text{Arcsin}((1/(n1)) \times \sin(\text{Arctan}((d1b)/2/(h1)))) \tag{B}$$

$$\text{Arccos}(\cos((\theta ib2) \times \cos(\theta a2)) \leq \text{Arcsin}(1/(n2)) \tag{C}$$

$$(\theta ib2) = \text{Arcsin}((1/(n2)) \times (\sin(\text{Arctan}((d2b)/2/(h2))))) \tag{D}$$

wherein h1 represents a distance from the first optical sheet to the light emitters of the light source in the main section of the first optical sheet and in the normal direction of the first optical sheet, d1b represents a distance between two adjacent light emitters in a longitudinal direction of the unit shaped elements of the first optical sheet, and n1 represents a refractive index of the first optical sheet, and wherein h2 presents a distance from the second optical sheet to the light emitters of the light source in the main section of the second optical sheet and in the normal direction of the second optical sheet, d2b represents a distance between two adjacent light emitters in a longitudinal direction of the unit shaped elements of the second optical sheet, and n2 represents a refractive index of the second optical sheet.

2. The optical member according to claim 1, wherein the proportion of the contour region, in which the angle θa1 between the tangent to the contour of the unit shaped element of the first optical sheet and the sheet surface of the first optical sheet satisfies the formulae (A) and (B), in the entire length of the contour of the unit shaped element of the first optical sheet in the main section of the first optical sheet, is not less than 30%.

3. The optical member according to claim 1, wherein:
the unit shaped elements of the second optical sheet includes a base material, and a light diffusing material dispersed in the base material; and
a degree of light diffusion in the unit shaped elements of the second optical sheet is higher than a degree of light diffusion in the body portion of the second optical sheet, higher than a degree of light diffusion in the unit shaped elements of the first optical sheet, and higher than a degree of light diffusion in the body portion of the first optical sheet.

4. The optical member according to claim 3, wherein a ratio of the refractive index of the light diffusing material of the unit shaped elements of the second optical sheet relative to a refractive index of the base material of the unit shaped elements of the second optical sheet is not more than 0.9 or not less than 1.1.

5. An optical member comprising:
a first optical sheet; and
a second optical sheet disposed on a light exit side of the first optical sheet, wherein:
the first optical sheet includes a body portion, and unit shaped elements arranged on the light exit side of the body portion and each extending linearly in a direction intersecting an arrangement direction;
the second optical sheet includes a body portion, and unit shaped elements arranged on the light exit side of the body portion and each extending linearly in a direction intersecting an arrangement direction;
the first optical sheet and the second optical sheet arc disposed such that the arrangement direction of the unit shaped elements of the first optical sheet intersects the arrangement direction of the unit shaped elements of the second optical sheet;
a ratio of a height H1 of the unit shaped elements of the first optical sheet from the body portion of the first optical sheet relative to an arrangement pitch P1 of the unit shaped elements of the first optical sheet is smaller than a ratio of a height H2 of the unit shaped elements of the second optical sheet from the body portion of the second optical sheet relative to an arrangement pitch P2 of the unit shaped elements of the second optical sheet, wherein
the optical member is disposed in a position facing a light source including light emitters, and
a proportion of a contour region in an entire length of a contour of each unit shaped element of the first optical sheet in a main section which is parallel both to a normal direction of the first optical sheet and to the arrangement direction of the unit shaped elements of the first optical sheet, in which region an angle θa1 between a tangent to the contour of the unit shaped element of the first optical sheet and a sheet surface of the first optical sheet satisfies following formulae (E) and (F), is not less than 10%, and;
a proportion of a contour region in an entire length of a contour of each unit shaped element of the second optical sheet in a main section which is parallel both to a normal direction of the second optical sheet and to the arrangement direction of the unit shaped elements of the second optical sheet, in which region an angle θa2 between a tangent to the contour of the unit shaped element of the second optical sheet and a sheet surface of the second optical sheet satisfies following formulae (G) and (H), is not less than 10%:

$$-10° \leq \text{Arcsin}((n1) \times \sin((\theta a1) - (\theta ia1))) - (\theta a1) \leq 10° \tag{E}$$

$$(\theta ia1) = \text{Arcsin}((1/(n1)) \times (\sin(\text{Arctan}((d1a)/2/(h1))))) \tag{F}$$

$$-10° \leq \text{Arcsin}((n2) \times \sin((\theta a2) - (\theta ia2))) - (\theta a2) \leq 10° \tag{G}$$

$$(\theta ia2) = \text{Arcsin}((1/(n2)) \times (\sin(\text{Arctan}((d2a)/2/(h2))))) \tag{H}$$

wherein h1 represents a distance from the first optical sheet to the light emitters of the light source in the main section of the first optical sheet and in the normal direction of the first optical sheet, d1a represents a distance between two adjacent light emitters in the arrangement direction of the unit shaped elements of the first optical sheet, and n1 represents a refractive index of the first optical sheet, and wherein h2 represents a distance from the second optical sheet to the light emitters of the light source in the main section of the second optical sheet and in the normal direction of the second optical sheet, d2a represents a distance between two adjacent light emitters in the arrangement direction of the unit shaped elements of the second optical sheet, and n2 represents a refractive index of the second optical sheet.

6. An optical member, disposed opposite to a light source including light emitters, comprising:

a first optical sheet; and a second optical sheet disposed on a light exit side of the first optical sheet, wherein:

the first optical sheet includes a body portion, and unit shaped elements arranged on the light exit side of the body portion and each extending linearly in a direction intersecting an arrangement direction;

the second optical sheet includes a body portion, and unit shaped elements arranged on the light exit side of the body portion and each extending linearly in a direction intersecting an arrangement direction;

the first optical sheet and the second optical sheet are disposed such that the arrangement direction of the unit shaped elements of the first optical sheet intersects the arrangement direction of the unit shaped elements of the second optical sheet; and a proportion of a contour region in an entire length of a contour of each unit shaped element of the first optical sheet in a main section which is parallel both to a normal direction of the first optical sheet and to the arrangement direction of the unit shaped elements of the first optical sheet, in which region an angle θa1 between a tangent to the contour of the unit shaped element of the first optical sheet and a sheet surface of the first optical sheet satisfies following formulae (I) and (J), is larger than a proportion of a contour region in an entire length of a contour of each unit shaped element of the second optical sheet in a main section which is parallel both to a normal direction of the second optical sheet and to the arrangement direction of the unit shaped elements of the second optical sheet, in which region an angle θa2 between a tangent to the contour of the unit shaped element of the second optical sheet and a sheet surface of the second optical sheet satisfies following formulae (K) and (L):

$$\text{Arccos}(\cos(\theta ib1) \times \cos(\theta a1)) \leq \text{Arcsin}(1/(n1)) \tag{I}$$

$$(\theta ib1) = \text{Arcsin}((1/(n1)) \times (\sin(\text{Arctan}((d1b)/2/(h1))))) \tag{J}$$

$$\text{Arccos}(\cos(\theta ib2) \times \cos(\theta a2)) \leq \text{Arcsin}(1/(n2)) \tag{K}$$

$$(\theta ib2) = \text{Arcsin}((1/(n2)) \times (\sin(\text{Arctan}((d2b)/2/(h2))))) \tag{L}$$

wherein h1 represents a distance from the first optical sheet to the light emitters of the light source in the main section of the first optical sheet and in the normal direction of the first optical sheet, d1b represents a distance between two adjacent light emitters in a longitudinal direction of the unit shaped elements of the first optical sheet, and n1 represents a refractive index of the first optical sheet, and wherein h2 represents a distance from the second optical sheet to the light emitters of the light source in the main section of the second optical sheet and in the normal direction of the second optical sheet, d2b represents a distance between two adjacent light emitters in a longitudinal direction of the unit shaped elements of the second optical sheet, and n2 represents a refractive index of the second optical sheet.

7. An optical member, disposed opposite a light source including light emitters, comprising:

a first optical sheet; and a second optical sheet disposed on a light exit side of the first optical sheet, wherein:

the first optical sheet includes a body portion, and unit shaped elements arranged on the light exit side of the body portion and each extending linearly in a direction intersecting an arrangement direction;

the second optical sheet includes a body portion, and unit shaped elements arranged on the light exit side of the body portion and each extending linearly in a direction intersecting an arrangement direction;

the first optical sheet and the second optical sheet are disposed such that the arrangement direction of the unit shaped elements of the first optical sheet intersects the arrangement direction of the unit shaped elements of the second optical sheet; and a proportion of a contour region in an entire length of a contour of each unit shaped element of the first optical sheet in a main section which is parallel both to a normal direction of the first optical sheet and to the arrangement direction of the unit shaped elements of the first optical sheet, in which region an angle θa1 between a tangent to the contour of the unit shaped element of the first optical sheet and a sheet surface of the first optical sheet satisfies following formulae (M) and (N), is not less than 30%:

$$\text{Arccos}(\cos(\theta ib1) \times \cos(\theta a1)) \leq \text{Arcsin}(1/(n1)) \tag{M}$$

$$(\theta ib1) = \text{Arcsin}((1/(n1)) \times (\sin(\text{Arctan}((d1b)/2/(h1))))) \tag{N}$$

wherein h1 represents a distance from the first optical sheet to the light emitters of the light source in the main section of the first optical sheet and in the normal direction of the first optical sheet, d1b represents a distance between two adjacent light emitters in a longitudinal direction of the unit shaped elements of the first optical sheet, and n1 represents a refractive index of the first optical sheet.

8. The optical member according to claim 6, wherein:

the unit shaped elements of the second optical sheet include a base material and a light diffusing material dispersed in the base material; and a degree of light diffusion in the unit shaped elements of the second optical sheet is higher than a degree of light diffusion in the body portion of the second optical sheet, higher than a degree of light diffusion in the unit shaped elements of the first optical sheet, and higher than a degree of light diffusion in the body portion of the first optical sheet.

9. The optical member according to claim 8, wherein a ratio of the refractive index of the light diffusing material of the unit shaped elements of the second optical sheet relative to a refractive index of the base material of the unit shaped elements of the second optical sheet is not more than 0.9 or not less than 1.1.

* * * * *